US009719562B2

(12) United States Patent
Azumai et al.

(10) Patent No.: US 9,719,562 B2
(45) Date of Patent: Aug. 1, 2017

(54) TRANSMISSION DEVICE

(71) Applicant: AISIN AW CO., LTD., Anjo-shi, Aichi-ken (JP)

(72) Inventors: Takahiro Azumai, Anjo (JP); Mitsunari Ishida, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 83 days.

(21) Appl. No.: 14/779,680

(22) PCT Filed: Apr. 25, 2014

(86) PCT No.: PCT/JP2014/061737
§ 371 (c)(1),
(2) Date: Sep. 24, 2015

(87) PCT Pub. No.: WO2014/178350
PCT Pub. Date: Nov. 6, 2014

(65) Prior Publication Data
US 2016/0053826 A1   Feb. 25, 2016

(30) Foreign Application Priority Data

Apr. 30, 2013 (JP) ................................. 2013-095098

(51) Int. Cl.
*F16D 21/06* (2006.01)
*F16D 25/0638* (2006.01)
(Continued)

(52) U.S. Cl.
CPC ........... *F16D 21/06* (2013.01); *F16D 13/683* (2013.01); *F16D 25/0638* (2013.01); *F16D 25/10* (2013.01); *F16H 3/663* (2013.01); *F16H 3/666* (2013.01); *F16H 57/08* (2013.01); *F16D 2021/0661* (2013.01); *F16H 2200/006* (2013.01); *F16H 2200/0086* (2013.01); *F16H 2200/2007* (2013.01); *F16H 2200/2023* (2013.01); *F16H 2200/2046* (2013.01);
(Continued)

(58) Field of Classification Search
None
See application file for complete search history.

(56) References Cited

U.S. PATENT DOCUMENTS

2010/0022342 A1   1/2010   Samie et al.
2010/0044184 A1   2/2010   Kito et al.
(Continued)

FOREIGN PATENT DOCUMENTS

DE   102006014737 A1   10/2007
DE   102008014517 A1    9/2009
(Continued)

OTHER PUBLICATIONS

Aug. 5, 2014 International Search Report issued in International Application No. PCT/JP2014/061737.
(Continued)

*Primary Examiner* — Colby M Hansen
(74) *Attorney, Agent, or Firm* — Oliff PLC

(57) ABSTRACT

A transmission device that includes a first clutch that includes a first clutch drum, a first piston, and a first engagement oil chamber; and a second clutch that includes a second clutch drum fixed to an outer circumferential portion of the first clutch drum, a second piston, and a second engagement oil chamber.

6 Claims, 11 Drawing Sheets

(51) Int. Cl.
  *F16H 3/66* (2006.01)
  *F16D 13/68* (2006.01)
  *F16H 57/08* (2006.01)
  *F16D 25/10* (2006.01)

(52) U.S. Cl.
  CPC ............... *F16H 2200/2069* (2013.01); *F16H 2200/2084* (2013.01); *F16H 2200/2097* (2013.01)

(56) References Cited

U.S. PATENT DOCUMENTS

| | | | |
|---|---|---|---|
| 2010/0078282 | A1 | 4/2010 | Kito et al. |
| 2012/0145511 | A1 | 6/2012 | Wilton |
| 2012/0247907 | A1* | 10/2012 | Kasuya ................ F16D 13/683 192/48.618 |

FOREIGN PATENT DOCUMENTS

| | | |
|---|---|---|
| EP | 2166245 A1 | 3/2010 |
| JP | S63-246544 A | 10/1988 |
| JP | H01-131051 U | 9/1989 |
| JP | H01-131052 U | 9/1989 |
| JP | H02-18936 U | 2/1990 |
| JP | H09-512888 A | 12/1997 |
| JP | H10-30714 A | 2/1998 |
| JP | 2000-205294 A | 7/2000 |
| JP | 2000-342512 A | 12/2000 |
| JP | 2001-340987 A | 12/2001 |
| JP | 2006-342845 A | 12/2006 |
| JP | 2007-268575 A | 10/2007 |
| JP | 2009-030654 A | 2/2009 |
| JP | 2011-075570 A | 4/2011 |
| JP | 2011-214711 A | 10/2011 |
| JP | 2012-215283 A | 11/2012 |
| JP | 2013-047634 A | 3/2013 |

OTHER PUBLICATIONS

U.S. Appl. No. 14/779,662, filed Sep. 24, 2015 in the name of Azumai.
May 17, 2016 Search Report issued in European Patent Application No. 14791066.5.
May 17, 2016 Search Report issued in European Patent Application No. 14792356.9.

* cited by examiner

FIG. 2

|   | | C-1 | C-2 | C-3 | C-4 | B-1 | B-2 | F-1 |
|---|---|---|---|---|---|---|---|---|
| D | 1st | ○ | | | | | ● | ○ |
| | 2nd | ○ | | | | ○ | | |
| | 3rd | ○ | | ○ | | | | |
| | 4th | ○ | | | ○ | | | |
| | 5th | ○ | ○ | | | | | |
| | 6th | | ○ | | ○ | | | |
| | 7th | | ○ | ○ | | | | |
| | 8th | | ○ | | | ○ | | |
| REV1 | | | | ○ | | | ○ | |
| REV2 | | | | | ○ | | ○ | |

※○: ENGAGED
●: ENGAGED WHEN ENGINE BRAKING IS IN OPERATION

TRANSMISSION DEVICE

BACKGROUND

The present disclosure relates to a transmission device that includes a first clutch and a second clutch that is disposed around the first clutch.

A transmission device of such a type has heretofore been known, which includes a clutch C1 structured as a multi-plate friction hydraulic clutch, and also includes a clutch C2 that is structured as a multi-plate friction hydraulic clutch and is disposed inside the clutch C1 (refer to Japanese Patent Application Publication No. 2012-215283, for example). The clutch C1 of the transmission device includes a clutch drum that includes a first outer cylinder portion, a first sidewall portion extending inward in the radial direction from the first outer cylinder portion, and an inner cylinder portion extending in the axial direction from the inner circumferential portion of the first sidewall portion; a clutch piston that defines a first engagement-side oil chamber with the clutch drum; and a cancel plate that defines, with the clutch piston, a first cancel oil chamber for canceling centrifugal hydraulic pressure produced in the first engagement-side oil chamber. A clutch drum of the clutch C2 disposed inside the clutch C1 includes a second outer cylinder portion and a second sidewall portion that extends inward in the radial direction from the second outer cylinder portion. The clutch drum of the clutch C2 is fastened together with the cancel plate of the clutch C1 to the first sidewall portion of the clutch drum of the clutch C1 via rivets.

SUMMARY

However, in the case of the above-described conventional transmission device in which the clutch drum of the clutch C2 is fastened together with the cancel plate of the clutch C1 to the clutch drum of the clutch C1 with the rivets, the number of components of the transmission device increases; the increase in the number of components leads to an increase in assembly man-hours; and forming accuracy and assembly accuracy of the components are required to be improved to ensure strength of the device after the clutches C1 and C2 are assembled. The above-described conventional transmission device is also still to be improved in terms of reduction in weight of the entire device.

Thus, the present disclosure according to an exemplary aspect reduces the number of components and the assembly man-hours of a first clutch and a second clutch disposed around the first clutch which constitute a transmission device, and to reduce the weight of the first and second clutches while ensuring the strength thereof.

A transmission device according to the present disclosure includes: a first clutch that includes a first clutch drum, a first piston, and a first engagement oil chamber; and a second clutch that includes a second clutch drum fixed to an outer circumferential portion of the first clutch drum, a second piston, and a second engagement oil chamber, wherein the first clutch drum includes a first outer cylinder portion that extends in an axial direction and is fitted with an outer circumferential portion of a first friction engagement plate, a first inner cylinder portion that extends in the axial direction inside the first outer cylinder portion and movably supports an inner circumferential portion of the first piston, and a first annular wall portion that is integrally formed with the first outer cylinder portion and the first inner cylinder portion so as to extend in a radial direction between the first outer cylinder portion and the first inner cylinder portion; the second clutch drum includes a second outer cylinder portion that extends in the axial direction and is fitted with an outer circumferential portion of a second friction engagement plate, a second inner cylinder portion that extends in the axial direction inside the second outer cylinder portion and movably supports an inner circumferential portion of the second piston, and a second annular wall portion integrally formed with the second outer cylinder portion and the second inner cylinder portion so as to extend in the radial direction between the second outer cylinder portion and the second inner cylinder portion; and an inner circumferential surface of the second inner cylinder portion is joined with an outer circumferential surface of the first clutch drum.

The first clutch drum of the first clutch constituting the transmission device includes the first outer cylinder portion that extends in the axial direction and is fitted with the outer circumferential portion of the first friction engagement plate; the first inner cylinder portion that extends in the axial direction inside the first outer cylinder portion and movably supports the inner circumferential portion of the first piston; and the first annular wall portion that is integrally formed with the first outer cylinder portion and the first inner cylinder portion so as to extend in the radial direction between the first outer cylinder portion and the first inner cylinder portion. The second clutch drum of the second clutch includes the second outer cylinder portion that extends in the axial direction and is fitted with the outer circumferential portion of the second friction engagement plate; the second inner cylinder portion that extends in the axial direction inside the second outer cylinder portion and movably supports the inner circumferential portion of the second piston; and the second annular wall portion integrally formed with the second outer cylinder portion and the second inner cylinder portion so as to extend in the radial direction between the second outer cylinder portion and the second inner cylinder portion. The inner circumferential surface of the second inner cylinder portion is joined with the outer circumferential surface of the first clutch drum.

In this manner, the first outer cylinder portion, the first inner cylinder portion, and the first annular wall portion of the first clutch drum are integrally formed with one another, so that the number of components and the assembly man-hours of the first clutch can be reduced, and the accuracy of various parts of the first clutch drum can easily be improved. In the second clutch drum, each of the second outer cylinder portion on the outside and the second inner cylinder portion on the inside functions as a rib, so that the strength of the second clutch drum can favorably be increased. Moreover, the inner circumferential surface of the second inner cylinder portion is joined with the outer circumferential surface of the first clutch drum, so that the joint strength therebetween can favorably be ensured. As a result, when the second clutch drum rotates, the free end of the second outer cylinder portion can favorably be restrained from expanding outward due to a centrifugal force. Hence, with this transmission device, the number of components and the assembly man-hours of the first clutch and the second clutch disposed around the first clutch can be reduced, and the weight of the first and second clutches can be reduced while ensuring the strength thereof.

The first annular wall portion of the first clutch drum may include a first outer annular wall portion extending toward the first inner cylinder portion from a base end of the first outer cylinder portion, and a distal end surface of the second inner cylinder portion of the second clutch drum may contact the first outer annular wall portion of the first clutch drum. This arrangement allows the first outer annular wall portion to accurately position the second clutch drum in the axial direction.

Moreover, the first annular wall portion of the first clutch drum may include a first intermediate cylinder portion that extends in the axial direction between the first outer cylinder portion and the first inner cylinder portion in the radial direction and include an outer circumferential surface having a diameter smaller than that of the first outer cylinder portion, and the inner circumferential surface of the second inner cylinder portion may be joined with the outer circumferential surface of the first intermediate cylinder portion. This arrangement can favorably ensure the axial length of the second inner cylinder portion and the first intermediate cylinder portion of the first clutch drum, that is, the length of the joint between the second inner cylinder portion and the first clutch drum so as to further increase the joint strength therebetween.

The inner circumferential surface of the second inner cylinder portion may be welded to the outer circumferential surface of the first clutch drum. In this manner, the inner circumferential surface of the second inner cylinder portion is welded to the outer circumferential surface of the first clutch drum, so that the welding strength therebetween can favorably be ensured. The inner circumferential surface of the second inner cylinder portion may, however, be bonded to the outer circumferential surface of the first clutch drum with adhesive therebetween.

Furthermore, the first clutch drum and the second clutch drum may each be made of an aluminum alloy, and the inner circumferential surface of the second inner cylinder portion may be welded by electron beam welding to the outer circumferential surface of the first clutch drum.

The distal end surface of the second inner cylinder portion of the second clutch drum may be welded to the first outer annular wall portion of the first clutch drum.

BRIEF DESCRIPTION OF THE DRAWINGS

FIG. 2 is an operation table representing relations of each shift speed of the automatic transmission with operating states of clutches and brakes thereof included in the power transmission device of FIG. 1.

DETAILED DESCRIPTION OF THE EMBODIMENTS

The following describes modes for carrying out the present disclosure with reference to the drawings.

Figure 1:
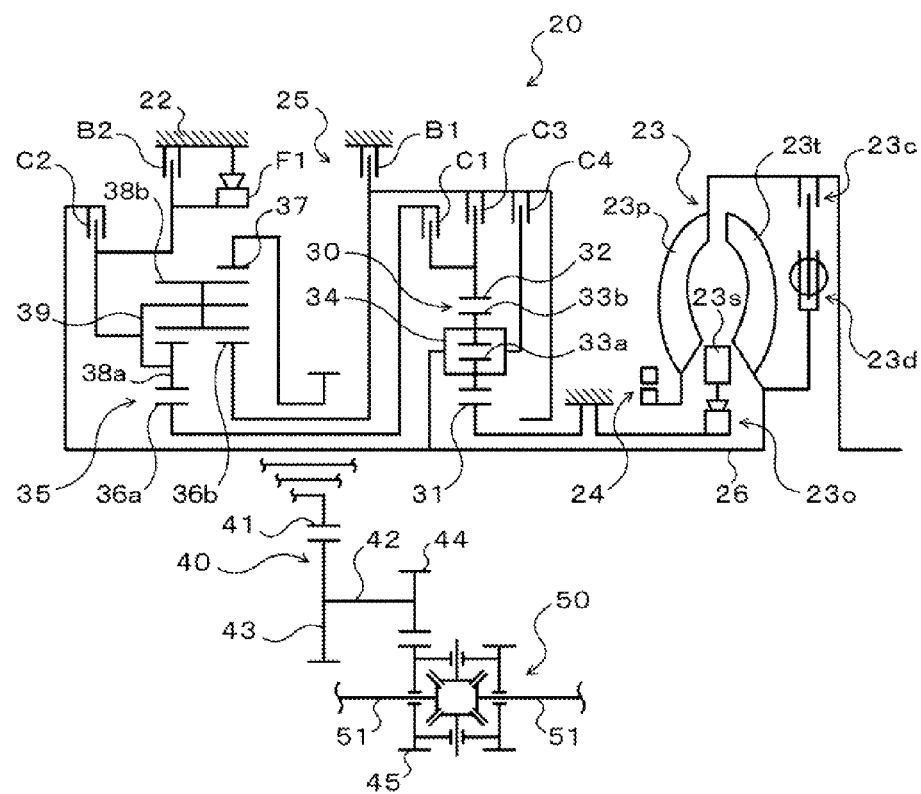
FIG. 1 is a schematic structure diagram of a power transmission device including an automatic transmission serving as a transmission device according to an embodiment of the present disclosure.

FIG. 1 is a schematic structure diagram of a power transmission device 20 including an automatic transmission 25 serving as a transmission device according to an embodiment of the present disclosure. The power transmission device 20 shown in FIG. 1 is connected to a crankshaft of an engine (not shown) mounted on a front-wheel drive vehicle, and can transmit power from the engine to right and left driving wheels (front wheels) (not shown). As shown in FIG. 1, the power transmission device 20 includes, for example, a transmission case 22, a starting device (fluid transmission apparatus) 23 accommodated in the transmission case 22, an oil pump 24, the automatic transmission 25, a gear mechanism (gear train) 40, and a differential gear (differential mechanism) 50.

The starting device 23 included in the power transmission device 20 is structured as a torque converter that includes, for example, a pump impeller $23p$ on the input side connected to the crankshaft of the engine; a turbine runner $23t$ on the output side connected to an input shaft (input member) 26 of the automatic transmission 25; a stator $23s$ that is disposed inside the pump impeller $23p$ and the turbine runner $23t$, and regulates the flow of hydraulic oil from the turbine runner $23t$ to the pump impeller $23p$; a one-way clutch $23o$ that restricts the direction of rotation of the stator $23s$ to one direction; a lock-up clutch $23c$; and a damper mechanism $23d$. The starting device 23 may, however, be structured as a fluid coupling that does not include the stator $23s$.

The oil pump 24 is structured as a gear pump that includes, for example, a pump assembly including a pump body and a pump cover, an external gear connected to the pump impeller $23p$ of the starting device 23 via a hub, and an internal gear meshing with the external gear. The oil pump 24 is driven by the power from the engine, suctions the hydraulic oil (ATF) reserved in an oil pan (not shown), and feeds the hydraulic oil with pressure to a hydraulic pressure control device (not shown) that generates hydraulic pressure required by the starting device 23 and the automatic transmission 25.

The automatic transmission 25 is structured as an eight-speed transmission, and, as shown in FIG. 1, includes, in addition to the input shaft 26, a double-pinion type first planetary gear mechanism 30, a Ravigneaux type second planetary gear mechanism 35, four clutches C1, C2, C3, and C4 and two brakes B1 and B2 for changing a power transmission path from the input side to the output side, and a one-way clutch F1.

The first planetary gear mechanism 30 of the automatic transmission 25 includes a sun gear 31 that is an external gear, a ring gear 32 that is an internal gear disposed concentrically with the sun gear 31, and a planetary carrier 34 that rotatably and revolvably holds a plurality of sets of two pinion gears $33a$ and $33b$ meshing each other, one of which meshing with the sun gear 31 while the other of which meshing with the ring gear 32. As shown in FIG. 1, the sun gear 31 of the first planetary gear mechanism 30 is fixed to the transmission case 22, and the planetary carrier 34 of the first planetary gear mechanism 30 is connected so as to rotate together with the input shaft 26. The first planetary gear mechanism 30 is structured as what is called a reduction gear, reducing the speed of the power transmitted to the planetary carrier 34 serving as an input element, and outputting the power with reduced speed to the ring gear 32 serving as an output element.

The second planetary gear mechanism 35 of the automatic transmission 25 includes a first sun gear 36a and a second sun gear 36b that are external gears; a ring gear 37 that is an internal gear disposed concentrically with the first and second sun gears 36a and 36b; a plurality of short pinion gears 38a meshing with the first sun gear 36a; a plurality of long pinion gears 38b meshing with the second sun gear 36b and the short pinion gears 38a, and also with the ring gear 37; and a planetary carrier 39 that rotatably and revolvably holds the plurality of short pinion gears 38a and the plurality of long pinion gears 38b. The ring gear 37 of the second planetary gear mechanism 35 serves as an output member of the automatic transmission 25, and the power transmitted from the input shaft 26 to the ring gear 37 is transmitted to the right and left driving wheels via the gear mechanism 40, the differential gear 50, and drive shafts 51. The planetary carrier 39 is supported by the transmission case 22 via the one-way clutch F1, and the direction of rotation of the planetary carrier 39 is restricted to one direction by the one-way clutch F1.

The clutch C1 is a multi-plate friction hydraulic clutch (friction engagement element) that includes a hydraulic servo constituted by, for example, a piston, a plurality of friction plates and separator plates, and an oil chamber supplied with the hydraulic oil, and that can couple (connect) and uncouple the ring gear 32 of the first planetary gear mechanism 30 and the first sun gear 36a of the second planetary gear mechanism 35. The clutch C2 is a multi-plate friction hydraulic clutch that includes a hydraulic servo constituted by, for example, a piston, a plurality of friction plates and separator plates, and an oil chamber supplied with the hydraulic oil, and that can couple (connect) and uncouple the input shaft 26 and the planetary carrier 39 of the second planetary gear mechanism 35. The clutch C3 is a multi-plate friction hydraulic clutch that includes a hydraulic servo constituted by, for example, a piston, a plurality of friction plates and separator plates, and an oil chamber supplied with the hydraulic oil, and that can couple (connect) and uncouple the ring gear 32 of the first planetary gear mechanism 30 and the second sun gear 36b of the second planetary gear mechanism 35. The clutch C4 is a multi-plate friction hydraulic clutch that includes a hydraulic servo constituted by, for example, a piston, a plurality of friction plates and separator plates, and an oil chamber supplied with the hydraulic oil, and that can couple (connect) and uncouple the planetary carrier 34 of the first planetary gear mechanism 30 and the second sun gear 36b of the second planetary gear mechanism 35.

The brake B1 is a multi-plate friction hydraulic brake that includes a hydraulic servo constituted by, for example, a plurality of friction plates and separator plates, and an oil chamber supplied with the hydraulic oil, and that can hold the second sun gear 36b of the second planetary gear mechanism 35 stationary with respect to the transmission case 22 and allow the second sun gear 36b to rotate with respect to the transmission case 22. The brake B2 is a multi-plate friction hydraulic brake that includes a hydraulic servo constituted by, for example, a plurality of friction plates and separator plates, and an oil chamber supplied with the hydraulic oil, and that can hold the planetary carrier 39 of the second planetary gear mechanism 35 stationary with respect to the transmission case 22 and allow the planetary carrier 39 rotate with respect to the transmission case 22.

The one-way clutch F1 includes, for example, an inner race connected (fixed) to the planetary carrier 39 of the second planetary gear mechanism 35, an outer race, a plurality of sprags, a plurality of springs (leaf springs), and a retainer, and transmits torque via the sprags when the outer race rotates relative to the inner race in one direction while allowing the inner and outer races to rotate relative to each other when the outer race rotates relative to the inner race in the other direction. The one-way clutch F1 may, however, have a structure, such as a roller clutch structure, other than the sprag clutch structure.

Figure 3:
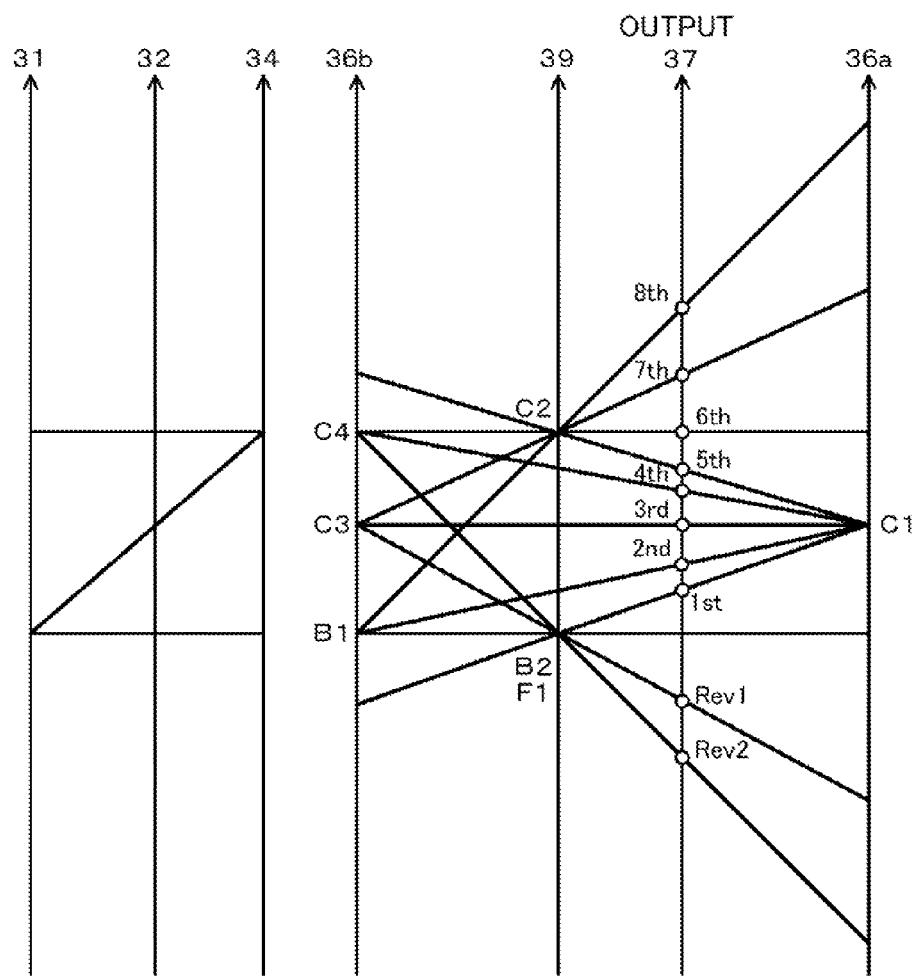
FIG. 3 is a velocity diagram illustrating relations in rotational speed among rotational elements constituting the automatic transmission included in the power transmission device of FIG. 1.

The clutches C1 to C4 and the brakes B1 and B2 operate in response to supply and discharge of the hydraulic oil by the hydraulic pressure control device described above. FIG. 2 shows an operation table representing relations of each shift speed of the automatic transmission 25 with operating states of the clutches C1 to C4, the brakes B1 and B2, and the one-way clutch F1. FIG. 3 shows a velocity diagram illustrating relations in rotational speed among rotational elements constituting the automatic transmission 25. The automatic transmission 25 places the clutches C1 to C4 and the brakes B1 and B2 in the states shown in the operation table of FIG. 2 so as to provide first to eighth forward shift speeds and first and second reverse shift speeds. At least one of the clutches C1 and C2 and the brakes B1 and B2 may be a meshing engagement element, such as a dog clutch.

The gear mechanism 40 includes a counter drive gear 41 connected to the ring gear 37 of the second planetary gear mechanism 35 of the automatic transmission 25; a counter driven gear 43 that is fixed to a counter shaft 42 extending parallel to the input shaft 26 of the automatic transmission 25 and meshes with the counter drive gear 41; a drive pinion gear (final drive gear) 44 integrally formed with (or fixed to) the counter shaft 42 so as to be spaced in the axial direction from the counter driven gear 43; and a differential ring gear (final driven gear) 45 that meshes with the drive pinion gear 44 and is connected to the differential gear 50.

Figure 4:
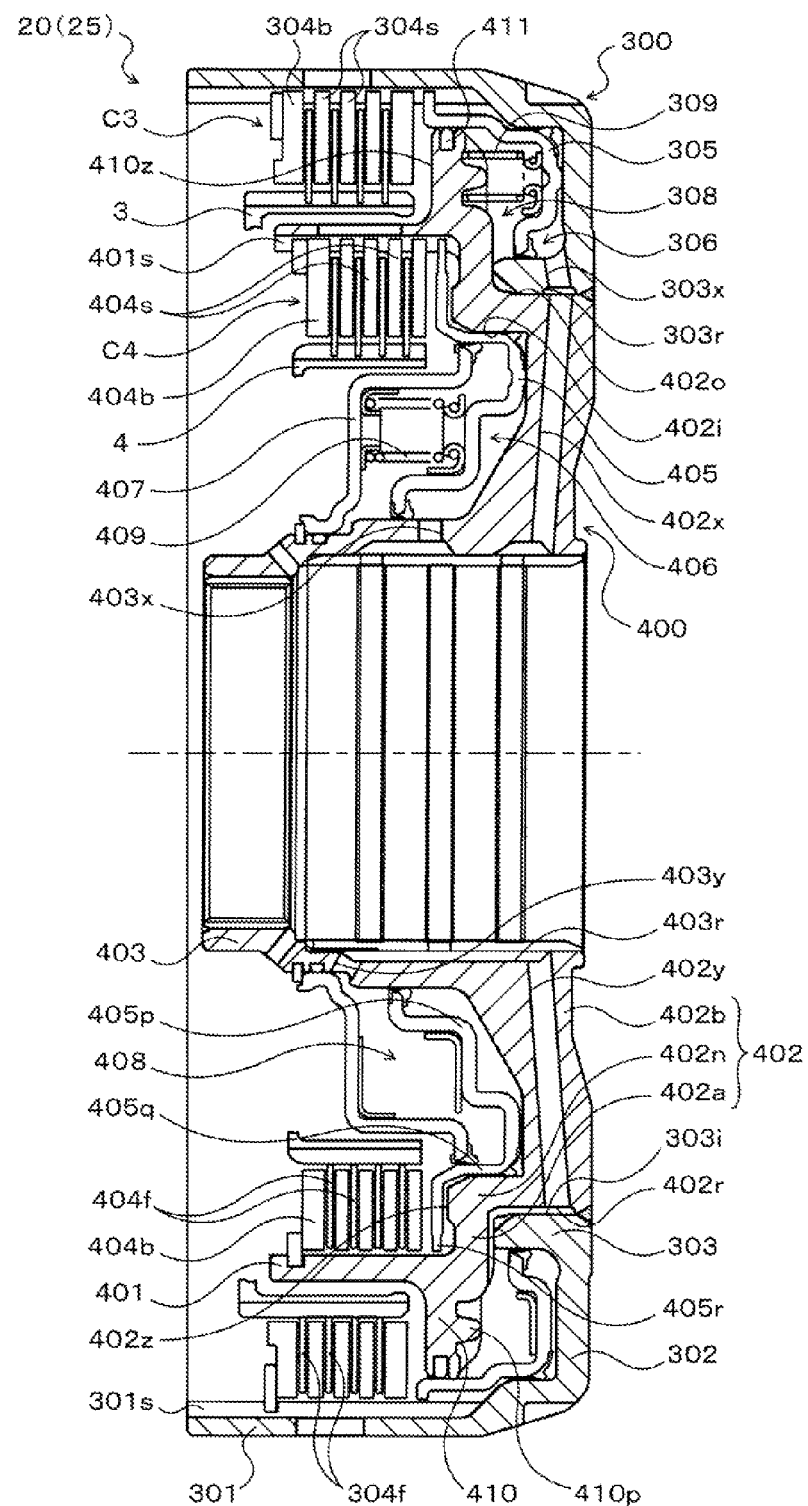
FIG. 4 is a partial sectional view showing a main part of the power transmission device of FIG. 1.

FIG. 4 is a partial sectional view showing a main part of the power transmission device 20. FIG. 4 shows the structure of the clutches C3 and C4 included in the automatic transmission 25 of the power transmission device 20 and the peripheral parts. As shown in FIG. 4, the clutch (second clutch) C3 coupling the ring gear 32 of the first planetary gear mechanism 30 with the second sun gear 36b of the second planetary gear mechanism 35 is disposed around the clutch (first clutch) C4 joining the planetary carrier 34 of the first planetary gear mechanism 30 with the second sun gear 36b of the second planetary gear mechanism 35.

The clutch C3 includes a clutch hub (second clutch hub) 3; a plurality of friction plates (second friction engagement plate) 304f that have inner circumferential portions fitted to the clutch hub 3; a clutch drum (second clutch drum) 300; a plurality of separator plates (second friction engagement plates) 304s and a backing plate 304b that have outer circumferential portions fitted to the clutch drum 300; and a piston (second piston) 305 that presses the friction plates 304f and the separator plates 304s to frictionally engage them with each other. The clutch hub 3 is connected to the ring gear 32 of the first planetary gear mechanism 30 serving as a power input member so as to rotate together with the ring gear 32. The clutch drum 300 is connected to the second sun gear 36b of the second planetary gear mechanism 35 serving as a power output member (target of transmission of power) so as to rotate together with the second sun gear 36b. Each of the friction plates 304f fitted to the clutch hub 3 is an annular member with friction materials attached to both surfaces thereof. Each of the separator plates 304s fitted to the clutch drum 300 is an annular member with both surfaces smoothly formed.

Figure 5:
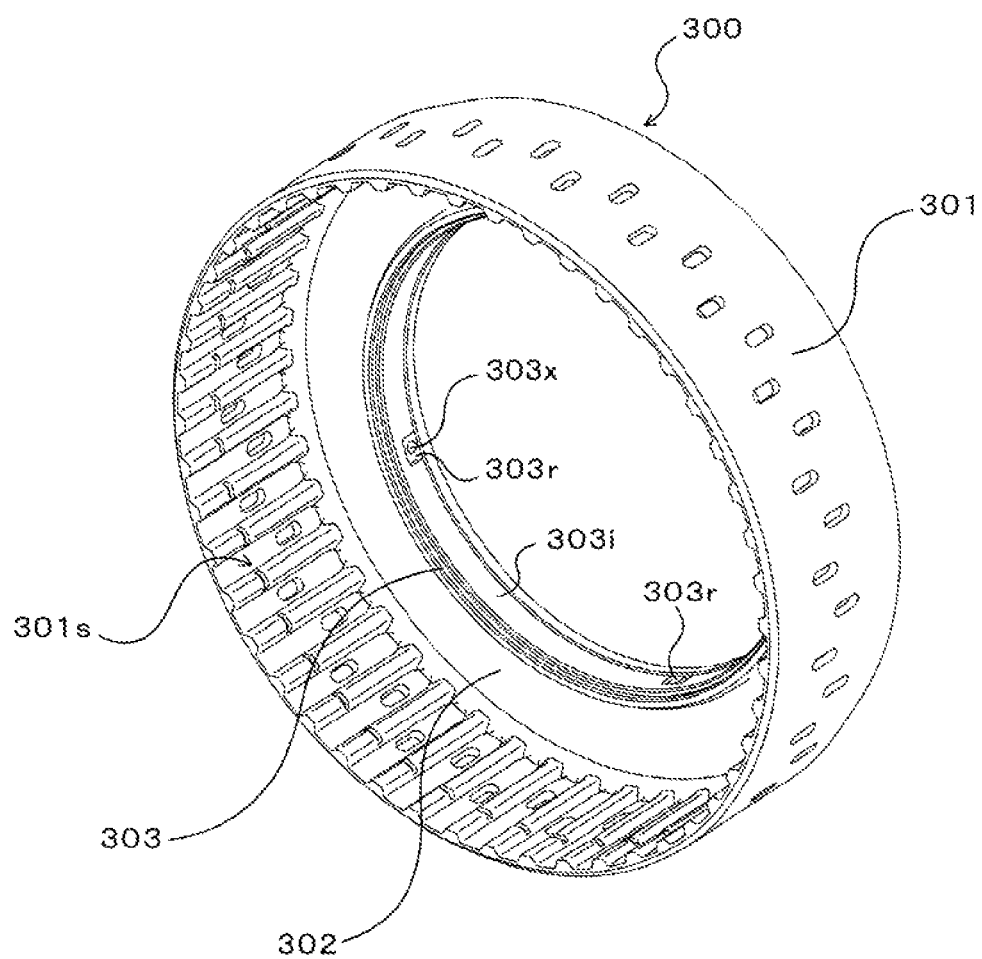
FIG. 5 is a perspective view showing a second clutch drum included in the power transmission device of FIG. 1.

As shown in FIGS. 4 and 5, the clutch drum 300 of the clutch C3 includes a substantially cylindrical outer cylinder portion (second outer cylinder portion) 301 that extends in the axial direction of the clutch drum 300 (automatic transmission 25), and is connected to the second sun gear 36b of the second planetary gear mechanism 35 via a connecting member (not shown); a substantially disc-shaped annular wall portion (second annular wall portion) 302 extending inward from the base end (right end in FIG. 4) of the outer cylinder portion 301; and a substantially cylindrical inner cylinder portion (second inner cylinder portion) 303 that extends from the inner circumferential portion of the annular wall portion 302 in the same direction as (coaxially with) the outer cylinder portion 301 so as to be located inside the outer cylinder portion 301, and extends in the axial direction of the clutch drum 300. The outer cylinder portion 301, the annular wall portion 302, and the inner cylinder portion 303 are integrally formed with one another, for example, by being cast from an aluminum alloy or the like. The annular wall portion 302 extends in the radial direction between the base end of the outer cylinder portion 301 and the base end of the inner cylinder portion 303. In the clutch drum 300 structured in this manner, each of the outer cylinder portion 301 on the outside and the inner cylinder portion 303 on the inside serves as a rib, so that the strength of the clutch drum 300 can favorably be increased.

The inner circumferential surface of the outer cylinder portion 301 of the clutch drum 300 is provided with splines 301s engageable with dents and protrusions provided on the outer circumferential portion of each of the separator plates 304s. The plurality of separator plates 304s are fitted to the splines 301s of the outer cylinder portion 301 so as to be arranged alternately with the plurality of friction plates 304f fitted to the clutch hub 3. The backing plate 304b is fitted to the splines 301s of the outer cylinder portion 301 so as to be capable of contacting one of the friction plates 304f placed closest to the first and second planetary gear mechanisms 30 and 35 (on the left side in FIG. 4), and is supported in the axial direction by a snap ring mounted on the outer cylinder portion 301.

The inner cylinder portion 303 is formed shorter than the outer cylinder portion 301, and the inner circumferential portion of the piston 305 is supported by the outer circumferential surface of the inner cylinder portion 303 and the inner circumferential surface of the outer cylinder portion 301 surrounding the inner cylinder portion 303 so as to be movable in the axial direction. Seal members are interposed between the inner circumferential portion of the piston 305 and the outer circumferential surface of the inner cylinder portion 303 and between the outer circumferential portion of the piston 305 and the inner circumferential surface of the outer cylinder portion 301, and an engagement oil chamber (second engagement oil chamber) 306 supplied with the hydraulic oil (engagement hydraulic pressure) for engaging the clutch C3 is defined between the annular wall portion 302 of the clutch drum 300 and the back surface of the piston 305. In other words, the clutch drum 300 and the piston 305 define the engagement oil chamber 306 in the clutch C3. In the present embodiment, dents and protrusions engageable with the splines 301s of the outer cylinder portion 301 are provided on the outer circumferential portion of the pressing portion of the piston 305 contacting one of the separator plates 304s located closest to the engine (on the right side in FIG. 4), and the piston 305 is also guided by the splines 301s. In addition, as shown in FIGS. 4 and 5, a plurality of oil holes (through-holes) 303x each communicating with the engagement oil chamber 306 are arranged with spaces therebetween in the circumferential direction in the inner cylinder portion 303, and a plurality of shallow recesses 303r each surrounding one of the oil holes 303x corresponding thereto are formed on an inner circumferential surface 303i of the inner cylinder portion 303.

The clutch C4 includes a clutch hub (first clutch hub) 4; a plurality of friction plates (first friction engagement plates) 404f that have inner circumferential portions fitted to the clutch hub 4; a clutch drum (first clutch drum) 400; a plurality of separator plates (first friction engagement plates) 404s and a backing plate 404b that have outer circumferential portions fitted to the clutch drum 400; and a piston (first piston) 405 that presses the friction plates 404f and the separator plates 404s to frictionally engage them with each other. The clutch hub 4 is connected to the planetary carrier 34 of the first planetary gear mechanism 30 serving as a power input member so as to rotate together with the planetary carrier 34. The clutch drum 400 is connected to the second sun gear 36b of the second planetary gear mechanism 35 serving as the power output member (target of transmission of power) so as to rotate together with the second sun gear 36b. Each of the friction plates 404f fitted to the clutch hub 4 is an annular member with friction materials attached to both surfaces thereof. Each of the separator plates 404s fitted to the clutch drum 400 is an annular member with both surfaces smoothly formed.

Figure 6:
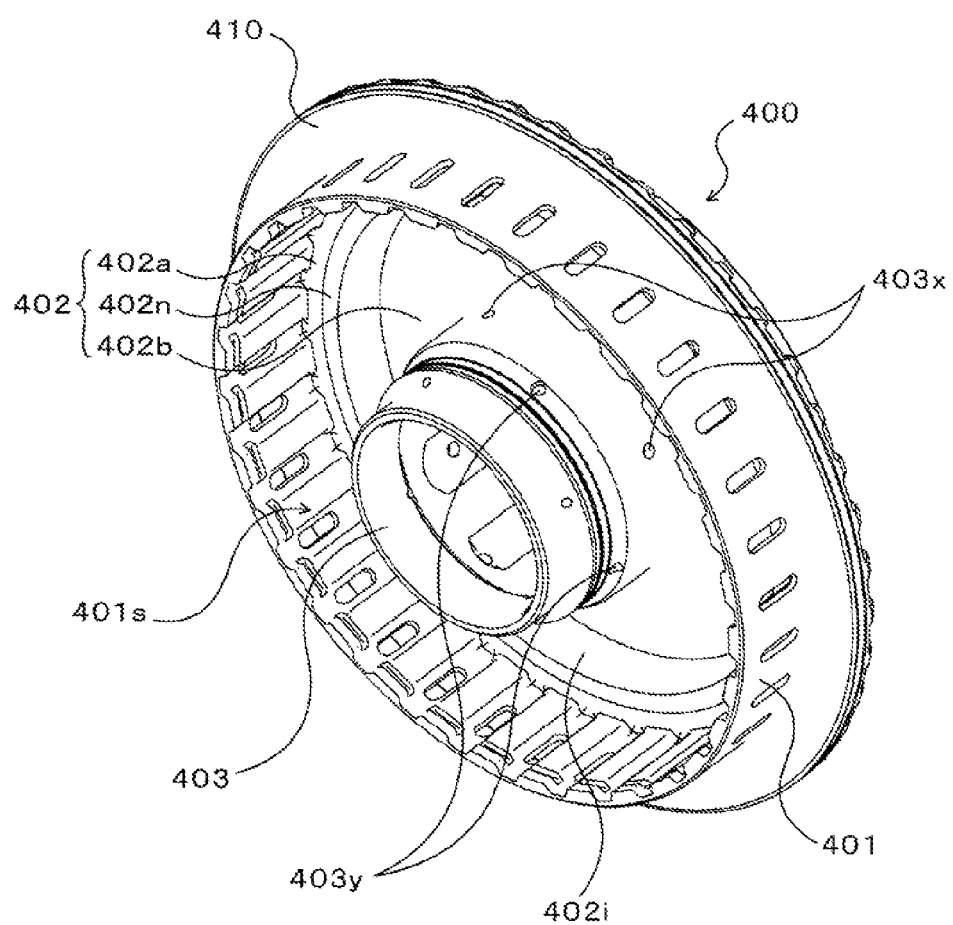
FIG. 6 is a perspective view showing a first clutch drum included in the power transmission device of FIG. 1.
Figure 7:
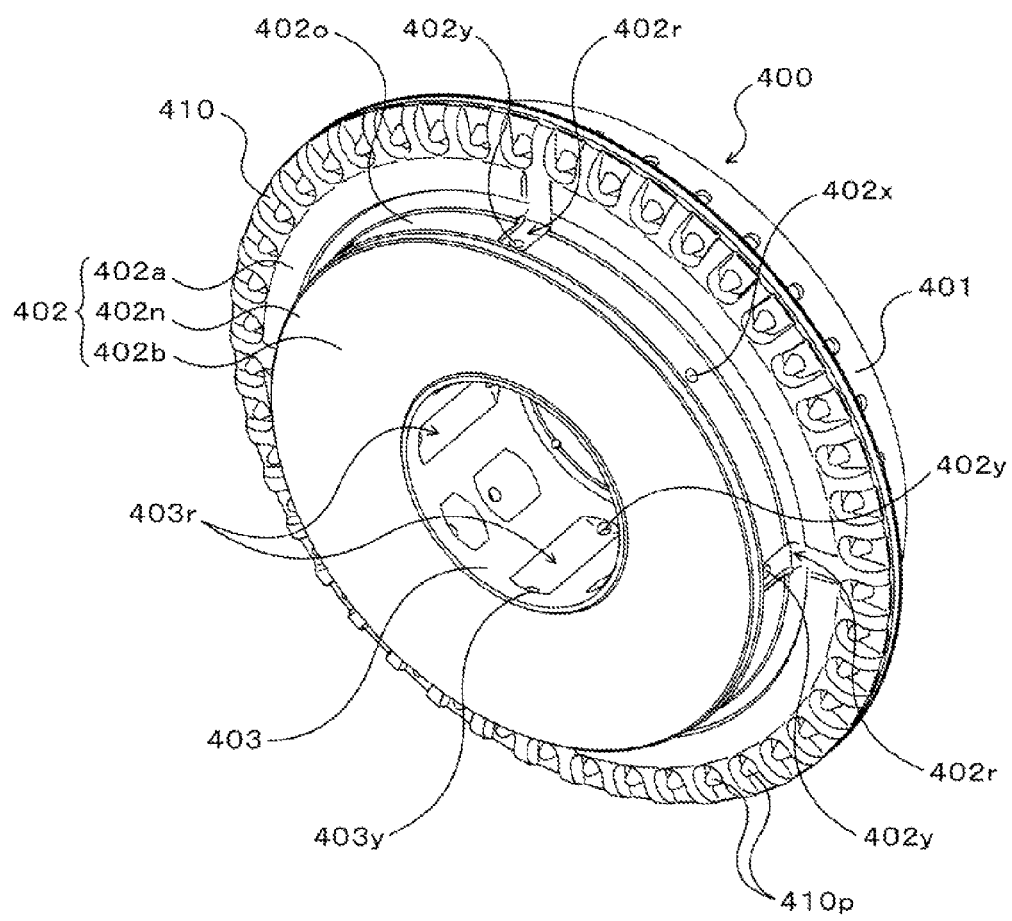
FIG. 7 is a perspective view showing the first clutch drum included in the power transmission device of FIG. 1.

As shown in FIGS. 4, 6 and 7, the clutch drum 400 of the clutch C4 includes a substantially cylindrical outer cylinder portion (first outer cylinder portion) 401 that extends in the axial direction of the clutch drum 400 (automatic transmission 25), and is connected to the second sun gear 36b of the second planetary gear mechanism 35 via a connecting member (not shown); a substantially disc-shaped annular wall portion (first annular wall portion) 402 extending inward from an end of the outer cylinder portion 401; and a substantially cylindrical inner cylinder portion (first inner cylinder portion) 403 that extends from the inner circumferential portion of the annular wall portion 402 in the same direction as (coaxially with) the outer cylinder portion 401 so as to be located inside the outer cylinder portion 401, and extends in the axial direction of the clutch drum 400. The outer cylinder portion 401, the annular wall portion 402, and the inner cylinder portion 403 are integrally formed with one another, for example, by being cast from an aluminum alloy or the like. The annular wall portion 402 extends inward in the radial direction between the base end of the outer cylinder portion 401 and the base end of the inner cylinder portion 403.

The inner circumferential surface of the outer cylinder portion 401 of the clutch drum 400 is provided with splines 401s engageable with dents and protrusions provided on the outer circumferential portion of each of the separator plates 404s. The plurality of separator plates 404s are fitted to the splines 401s of the outer cylinder portion 401 so as to be arranged alternately with the plurality of friction plates 404f fitted to the clutch hub 4. The backing plate 404b is fitted to the splines 401s of the outer cylinder portion 401 so as to be capable of contacting one of the friction plates 404f placed closest to the first and second planetary gear mechanisms 30 and 35 (on the left side in FIG. 4), and is supported in the axial direction by a snap ring mounted on the outer cylinder portion 401.

The annular wall portion 402 of the clutch drum 400 includes an outer wall portion (first outer annular wall portion) 402a extending toward the inner cylinder portion 403, that is, inward in the radial direction, from the base end of the outer cylinder portion 401, and includes an inner wall portion (first inner annular wall portion) 402b that is offset relative to the outer wall portion 402a in a direction away from the outer cylinder portion 401 so as to be located closer to the engine than the outer wall portion 402a (on the side opposite to the free end (open end) of the clutch drum 400, that is, on the right side in FIG. 4), and that extends in the radial direction between the outer wall portion 402a and the inner cylinder portion 403. Accordingly, in the annular wall portion 402, a reduced diameter portion (first intermediate cylinder portion) 402n that has an outer circumferential surface 402o and an inner circumferential surface 402i having diameters smaller than that of the outer cylinder portion 401, and that extends in the axial direction of the clutch drum 400 between the outer cylinder portion 401 and the inner cylinder portion 403 in the radial direction is provided so as to be located on the opposite side of the outer cylinder portion 401 with the outer wall portion 402a interposed therebetween. The inner cylinder portion 403 of the clutch drum 400 is formed longer than the outer cylinder portion 401, and the piston 405 is supported by the outer circumferential surface of the inner cylinder portion 403 and the inner circumferential surface 402i of the reduced diameter portion 402n so as to be movable in the axial direction.

In the present embodiment, the piston 405 of the clutch C4 includes a base portion (inner circumferential portion) 405p movably supported by the outer circumferential surface of the inner cylinder portion 403, a cylindrical portion 405q movably supported by the inner circumferential surface 402i of the reduced diameter portion 402n, and a pressing portion 405r contacting one of the separator plates 404s located closest to the engine (on the right side in FIG. 4), and dents and protrusions engageable with the splines 401s of the outer cylinder portion 401 are provided on the outer circumferential portion of the pressing portion 405r. These dents and protrusions allow the piston 405 to be also guided by the splines 401s. Seal members are interposed between the base portion 405p of the piston 405 and the outer circumferential surface of the inner cylinder portion 403 and between the cylindrical portion 405q of the piston 405 and the inner circumferential surface 402i of the reduced diameter portion 402n, and an engagement oil chamber (first engagement oil chamber) 406 supplied with the hydraulic oil (engagement hydraulic pressure) for engaging the clutch C4 is defined between the inner wall portion 402b of the clutch drum 400 and the back surface of the piston 405. In other words, the clutch drum 400 and the piston 405 define the engagement oil chamber 406 in the clutch C4. A plurality of oil holes 403x for C4 engagement oil chamber each communicating with the engagement oil chamber 406 are arranged with spaces therebetween in the circumferential direction in the inner cylinder portion 403, and the hydraulic oil is supplied to and discharged from the engagement oil chamber 406 through an oil passage (not shown) formed, for example, in the input shaft 26 and the oil holes 403x for C4 engagement oil chamber.

In addition, the inner cylinder portion 403 of the clutch drum 400 supports a cancel plate 407 so as to rotate together with the cancel plate 407 in a position closer to the first and second planetary gear mechanisms 30 and 35 than the piston 405 (on the left side thereof in FIG. 4). The inner circumferential portion of the cancel plate 407 is supported in the axial direction by a snap ring mounted on the inner cylinder portion 403, and a seal member is interposed between the outer circumferential portion of the cancel plate 407 and the inner circumferential surface of the cylindrical portion 405q of the piston 405. In this arrangement, the cancel plate 407, together with the piston 405, defines a centrifugal hydraulic pressure cancel chamber (first cancel oil chamber) 408 for canceling centrifugal hydraulic pressure produced in the engagement oil chamber 406. A plurality of oil holes 403y for C4 cancel chamber each communicating with the centrifugal hydraulic pressure cancel chamber 408 are arranged with spaces therebetween in the circumferential direction in the inner cylinder portion 403, and a plurality of return springs 409 are interposed between the piston 405 and the cancel plate 407.

The clutch drum 300 of the clutch C3 disposed around the clutch C4 structured as described above is fixed to the outer circumferential surface of the clutch drum 400 of the clutch C4 so as to surround at least a part of the outer cylinder portion 401. Specifically, the inner cylinder portion 303 of the clutch drum 300 is fitted to the reduced diameter portion 402n of the clutch drum 400 so that the distal end surface of the inner cylinder portion 303 contacts the back surface of the outer wall portion 402a of the clutch drum 400 (annular wall portion 402), and the inner circumferential surface 303i of the inner cylinder portion 303 is joined with the outer circumferential surface 402o of the reduced diameter portion 402n by welding (such as electron beam welding or laser welding). With this arrangement, even if the joining portion between the inner cylinder portion 303 and the clutch drum 400 is displaced inward in the radial direction, the axial length of the inner cylinder portion 303 (inner circumferential surface 303i) and the reduced diameter portion 402n (outer circumferential surface 402o) of the clutch drum 400, that is, the length of the joint between the inner cylinder portion 303 and the clutch drum 400 can be sufficiently ensured to further increase the joint strength between the clutch drums 300 and 400, while favorably increasing the strength of the clutch drum 300 by utilizing each of the outer cylinder portion 301 on the outside and the inner cylinder portion 303 on the inside as a rib, as described above. As a result, in the automatic transmission 25, when the clutch drums 300 and 400 integrally rotate with the second sun gear 36b of the second planetary gear mechanism 35, the free end (left end in FIG. 4) of the outer cylinder portion 301 of the clutch drum 300 can favorably be restrained from expanding outward due to a centrifugal force. The clutch drum 300 is fitted to the reduced diameter portion 402n so that the distal end of the inner cylinder portion 303 contacts the back surface of the outer wall portion 402a of the clutch drum 400; consequently, the outer wall portion 402a can accurately position the clutch drum 300 in the axial direction. An electron beam may be projected in the orthogonal direction (in the axial direction of the clutch drum 400) from the open end side of the clutch drum 400 to weld the distal end surface of the inner cylinder portion 303 of the clutch drum 300 to the back surface of the outer wall portion 402a of the clutch drum 400 (annular wall portion 402). Accordingly, the joint strength between the clutch drums 300 and 400 is further increased to enhance the entire rigidity.

In the automatic transmission 25 of the present embodiment, the clutch drum 400 (the drum outer circumferential surface, that is, the outer cylinder portion 401) of the clutch C4 is integrally formed with a ring-shaped cancel oil chamber defining portion 410 that defines, with the clutch drum 300 and the piston 305, a centrifugal hydraulic pressure cancel chamber 308 for canceling centrifugal hydraulic pressure produced in the engagement oil chamber 306 of the clutch C3 on the outside. As shown in FIG. 4, the cancel oil chamber defining portion 410 extends from the outer circumferential surface of the outer cylinder portion 401 outward (outward in the radial direction), that is, toward the inner circumferential surface of the outer cylinder portion 301 of the clutch drum 300, and the outer circumferential surface of the cancel oil chamber defining portion 410 slidingly contacts the inner circumferential surface of the piston 305 of the clutch C3. As shown in FIG. 4, an end surface 410z of the cancel oil chamber defining portion 410 located on a side thereof closer to the open end side of the clutch drum 400 is located closer to the free end side (open end side) of the clutch drum 400 than an end surface 402z of the outer wall portion 402a of the annular wall portion 402 located on a side thereof closer to the open end side of the clutch drum 400.

In this manner, the cancel oil chamber defining portion 410 for the clutch C3 is integrally formed with the clutch drum 400 of the clutch C4 including the outer cylinder portion 401, the annular wall portion 402 (the outer wall portion 402a, the inner wall portion 402b, and the reduced diameter portion 402n), and the inner cylinder portion 403, so that the number of components and the assembly man-hours of the clutches C3 and C4 can be reduced, and the accuracy of various parts of the clutch drum 400, that is, the positional accuracy of the outer cylinder portion 401, the annular wall portion 402, the inner cylinder portion 403, and the cancel oil chamber defining portion 410 can easily be improved. The outer cylinder portion 401, the annular wall portion 402, the inner cylinder portion 403, and the cancel oil chamber defining portion 410 are integrally formed with one another, so that the outer cylinder portion 401 and the inner cylinder portion 403 can function as ribs and the thickness of the cancel oil chamber defining portion 410 is secured to favorably ensure strength of the clutch drum 400. Accordingly, the clutch drum 400 can be made of a light-weight material, such as an aluminum alloy, to be reduced in weight. In addition, in the present embodiment, the cancel oil chamber defining portion 410 is offset from the outer wall portion 402a of the clutch drum 400 in the axial direction of the outer cylinder portion 401 so as to be located closer to the first and second planetary gear mechanisms 30 and 35 than the outer wall portion 402a of the clutch drum 400 (on the left side thereof in FIG. 4). In other words, the end surface 410z of the cancel oil chamber defining portion 410 is located closer to the free end side (open end side) of the clutch drum 400 than the end surface 402z of the outer wall portion 402a. In this manner, the cancel oil chamber defining portion 410 is offset from the outer wall portion 402a in the axial direction of the outer cylinder portion 401, so that a stress concentration is reduced in the vicinity of the base end of the outer cylinder portion 401, that is, the connecting portion (corner portion) between the outer cylinder portion 401 and the outer wall portion 402a, whereby the strength of the clutch drum 400 can be further increased.

A seal member 411, such as a D-ring or an O-ring, is interposed between the outer circumferential surface of the cancel oil chamber defining portion 410 and the inner circumferential surface of the piston 305, whereby the centrifugal hydraulic pressure cancel chamber 308 is defined between the piston 305 and the back surfaces of the cancel oil chamber defining portion 410 and the outer wall portion 402a (surfaces on the right side in FIG. 4). In addition, a plurality of return springs 309 are interposed between the back surface of the cancel oil chamber defining portion 410 and the piston 305. As described above, the clutch drum 300 is fitted to the reduced diameter portion 402n so that the distal end of the inner cylinder portion 303 contacts the back surface of the outer wall portion 402a of the clutch drum 400. This arrangement can improve the positioning accuracy of the piston 305 supported by the inner cylinder portion 303 and the return springs 309 interposed between the piston 305 and the cancel oil chamber defining portion 410. In the present embodiment, a plurality of projections 410p are provided at even intervals on the back surface of the cancel oil chamber defining portion 410, each of the plurality of projections 410p projecting toward the piston 305 and engaging with one end of the corresponding return spring 309.

Moreover, in the automatic transmission 25 of the present embodiment, in order to allow the hydraulic oil to be supplied to and discharged from the engagement oil chamber 306 and the centrifugal hydraulic pressure cancel chamber 308 of the clutch C3 that are defined around the inner cylinder portion 303 of the clutch drum 300, a plurality (the same number as the oil holes 303x) of oil passages (first oil passages) 402x for engagement oil chamber which extend in the radial direction in a radiating manner are formed in the inner wall portion 402b of the clutch drum 400, and a plurality of oil passages (second oil passages) 402y for cancel chamber that extend in the radial direction in a radiating manner alternately with the oil passages 402x for engagement oil chamber so as not to overlap the oil passages 402x when viewed from the axial direction are formed in the inner wall portion 402b of the clutch drum 400. In this manner, the oil passages 402x for engagement oil chamber and the oil passages 402y for cancel chamber are formed on substantially the same plane in the inner wall portion 402b of the clutch drum 400, so that increase in the axial length of the clutch drum 400, that is, the clutches C3 and C4, is suppressed. In addition, the oil passages 402x for engagement oil chamber and the oil passages 402y for cancel chamber are formed alternately with each other when viewed from the axial direction, so that the hydraulic oil can be substantially evenly supplied to the engagement oil chamber 306 and the centrifugal hydraulic pressure cancel chamber 308, each having a ring shape.

Each of the oil passages 402x for engagement oil chamber is connected to the hydraulic pressure control device (not shown) through an oil passage (not shown) formed, for example, in the input shaft 26, and communicates with one of the oil holes 303x of the inner cylinder portion 303 corresponding thereto via one of the shallow recesses 303r formed on the inner circumferential surface 303i of the inner cylinder portion 303 (refer to FIGS. 4 and 5). In this manner, the recess 303r surrounding each of the oil holes 303x is formed on the inner circumferential surface 303i of the inner cylinder portion 303. As a result, when the clutch drum 300 is joined with the clutch drum 400, even if the plurality of oil passages 402x for engagement oil chamber of the inner wall portion 402b do not completely directly face the plurality of oil holes 303x of the inner cylinder portion 303, the oil passages 402x for engagement oil chamber can more surely communicate with the oil holes 303x. Instead of forming the recess 303r surrounding each of the oil holes 303x on the inner circumferential surface 303i of the inner cylinder portion 303, the recess 303r surrounding an opening of each of the oil passages 402x for engagement oil chamber may be formed on the outer circumferential surface 402o of the reduced diameter portion 402n.

Each of the oil passages 402y for cancel chamber is connected to the hydraulic pressure control device (draining oil passage) through an oil passage formed, for example, in the input shaft 26. In addition, in the present embodiment, a plurality of recesses 402r extending in a substantially L-shape (refer to FIGS. 4 and 7) are formed at even intervals on the back surface of the outer wall portion 402a and the outer circumferential surface 402o of the reduced diameter portion 402n of the clutch drum 400. An end on the outer circumferential surface 402o side of each of the oil passages 402y for cancel chamber opens in one of the recesses 402r corresponding thereto, and an end on the outer wall portion 402a side of each of the recesses 402r communicates with the centrifugal hydraulic pressure cancel chamber 308 of the clutch C3. This arrangement allows the hydraulic oil (drained oil) to be supplied to and discharged from the centrifugal hydraulic pressure cancel chamber 308 of the clutch C3 through the oil passage (not shown) formed in the input shaft 26, the oil passages 402y for cancel chamber, and the recesses 402r. In the present embodiment, as shown in FIGS. 4 and 7, a plurality of recesses 403r are formed on the inner circumferential surface of the inner cylinder portion 403 of the clutch drum 400, the recesses 403r communicating, on a one-to-one basis, inside openings of the oil passages 402y for cancel chamber with the oil holes 403y for C4 cancel chamber communicating with the centrifugal hydraulic pressure cancel chamber 408 of the clutch C4. The hydraulic oil (drained oil) is supplied to and discharged from the oil passages 402y for cancel chamber and the oil holes 403y for C4 cancel chamber via the recesses 403r. Instead of forming the plurality of recesses 402r on the back surface of the outer wall portion 402a and the outer circumferential surface 402o of the reduced diameter portion 402n of the clutch drum 400, recesses similar to the recesses 402r may be formed on the inner cylinder portion 303 of the clutch drum 300.

As described above, the clutch drum (first clutch drum) 400 of the clutch (first clutch) C4 constituting the automatic transmission 25 of the power transmission device 20 includes the outer cylinder portion (first outer cylinder portion) 401 that extends in the axial direction and is fitted to the outer circumferential portion of each of the separator plates (first friction engagement plates) 404s; the inner cylinder portion (first inner cylinder portion) 403 that extends in the axial direction inside the outer cylinder portion 401 and movably supports the base portion (inner circumferential portion) 405p of the piston (first piston) 405; and the annular wall portion 402 that is integrally formed with the outer cylinder portion 401 and the inner cylinder portion 403 so as to extend in the radial direction between the outer cylinder portion 401 and the inner cylinder portion 403. The annular wall portion 402 includes the reduced diameter portion (first intermediate cylinder portion) 402n that extends in the axial direction between the outer cylinder portion 401 and the inner cylinder portion 403 in the radial direction; the outer wall portion (first outer annular wall portion) 402a that extends in the radial direction between the reduced diameter portion 402n and the outer cylinder portion 401; and the inner wall portion (first inner annular wall portion) 402b that extends in the radial direction between the inner cylinder portion 403 and the reduced diameter portion 402n. Moreover, the clutch drum (second clutch drum) 300 of the clutch (second clutch) C3 disposed around the clutch C4 is fixed to the clutch drum 400 so as to surround at least a part of the outer cylinder portion 401. The cancel oil chamber defining portion 410 defines the centrifugal hydraulic pressure cancel chamber (second cancel oil chamber) 308 for canceling the centrifugal hydraulic pressure produced in the engagement oil chamber (second engagement oil chamber) 306 of the clutch C3, and is integrally formed with the clutch drum 400 so as to extend outward from the outer circumferential surface of the outer cylinder portion 401. The end surface 410z of the cancel oil chamber defining portion 410 is located closer to the open end side (free end side) of the clutch drum 400 than the end surface 402z of the outer wall portion 402a. This arrangement can reduce the number of components and the assembly man-hours of the clutch C4 and the clutch C3 disposed around the clutch C4, and can reduce the weight of the clutches C3 and C4 while ensuring the strength thereof.

In the clutch drum 300 of the clutch C3, each of the outer cylinder portion 301 on the outside and the inner cylinder portion 303 on the inside functions as a rib, so that the strength of the clutch drum 300 can favorably be increased. In addition, the inner circumferential surface 303i of the inner cylinder portion 303 is welded to the outer circumferential surface of the clutch drum 400, so that the joint strength therebetween can favorably be ensured. As a result, when the clutch drum 300 rotates, the free end (open end) of the outer cylinder portion 301 of the clutch drum 300 can favorably be restrained from expanding outward due to the centrifugal force. Instead of being welded to the outer circumferential surface of the clutch drum 400, however, the inner circumferential surface 303i of the inner cylinder portion 303 may be bonded to the outer circumferential surface of the clutch drum 400 with adhesive therebetween.

Moreover, as in the embodiment described above, the cancel oil chamber defining portion 410 is offset from the outer wall portion 402a in the axial direction of the outer cylinder portion 401 so that the end surface 410z is located closer to the free end side (open end side) of the clutch drum 400 than the end surface 402z of the outer wall portion 402a. As a result, the stress concentration is reduced in the vicinity of the base end of the outer cylinder portion 401, that is, the connecting portion (corner portion) between the outer cylinder portion 401 and the outer wall portion 402a, whereby the strength of the clutch drum 400 can be further increased. Furthermore, as in the embodiment described above, the inner circumferential surface 303i of the inner cylinder portion 303 is joined with the outer circumferential surface 402o of the reduced diameter portion 402n, so that the axial length of the inner cylinder portion 303 and the reduced diameter portion 402n of the clutch drum 400, that is, the length of the joint between the inner cylinder portion 303 and the clutch drum 400 can favorably be ensured to further increase the joint strength therebetween.

In the embodiment described above, the inner cylinder portion 303 of the clutch drum 300 is fitted to the reduced diameter portion 402n of the clutch drum 400 so that the distal end surface of the inner cylinder portion 303 contacts the back surface of the outer wall portion 402a of the clutch drum 400 (annular wall portion 402). This arrangement allows the outer wall portion 402a to accurately position the clutch drum 300 in the axial direction, and can improve the positioning accuracy of the piston 305 supported by the inner cylinder portion 303 and the return springs 309 interposed between the piston 305 and the cancel oil chamber defining portion 410.

A transmission device according to a second embodiment of the present disclosure will be described with reference to FIGS. 8 to 11.

Figure 8:
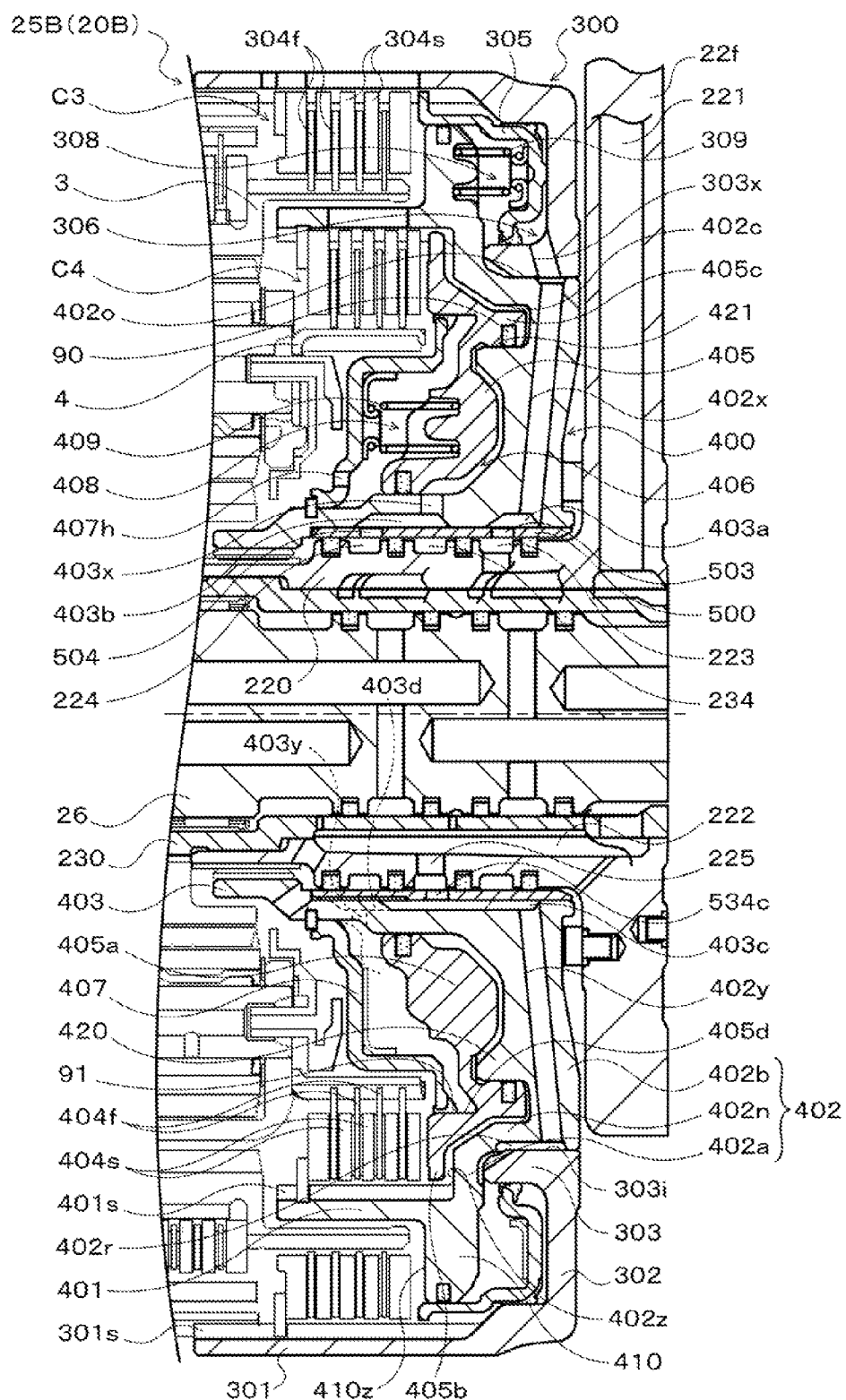
FIG. 8 is an enlarged main part sectional view showing a transmission device according to a second embodiment of the present disclosure.

FIG. 8 is an enlarged main part sectional view showing a power transmission device 20B including an automatic transmission 25B serving as the transmission device according to the second embodiment of the present disclosure. FIG. 8 shows the structure of the clutches C3 and C4 included in the automatic transmission 25B of the power transmission device 20B and the peripheral parts. The clutch (second clutch) C3 coupling the ring gear 32 of the first planetary gear mechanism 30 with the second sun gear 36b of the second planetary gear mechanism 35 is disposed around the clutch (first clutch) C4 coupling the planetary carrier 34 of the first planetary gear mechanism 30 with the second sun gear 36b of the second planetary gear mechanism 35 as shown in FIG. 8.

The clutch C3 includes the clutch hub (second clutch hub) 3; the plurality of friction plates (second friction engagement plate) 304f that have inner circumferential portions fitted to the clutch hub 3; the clutch drum (second clutch drum) 300; the plurality of separator plates (second friction engagement plates) 304s that have the outer circumferential portions fitted to the clutch drum 300; and the piston (second piston) 305 that presses the friction plates 304f and the separator plates 304s to frictionally engage them with each other. The clutch hub 3 is integrated (connected) with the ring gear 32 of the first planetary gear mechanism 30 serving as a power input member so as to rotate together with the ring gear 32. The clutch drum 300 is connected to the second sun gear 36b of the second planetary gear mechanism 35 serving as a power output member (target of transmission of power) so as to rotate together with the second sun gear 36b. Each of the friction plates 304f fitted to the clutch hub 3 is an annular member with friction materials attached to both surfaces thereof. Each of the separator plates 304s fitted to the clutch drum 300 is an annular member with both surfaces smoothly formed.

Figure 9:
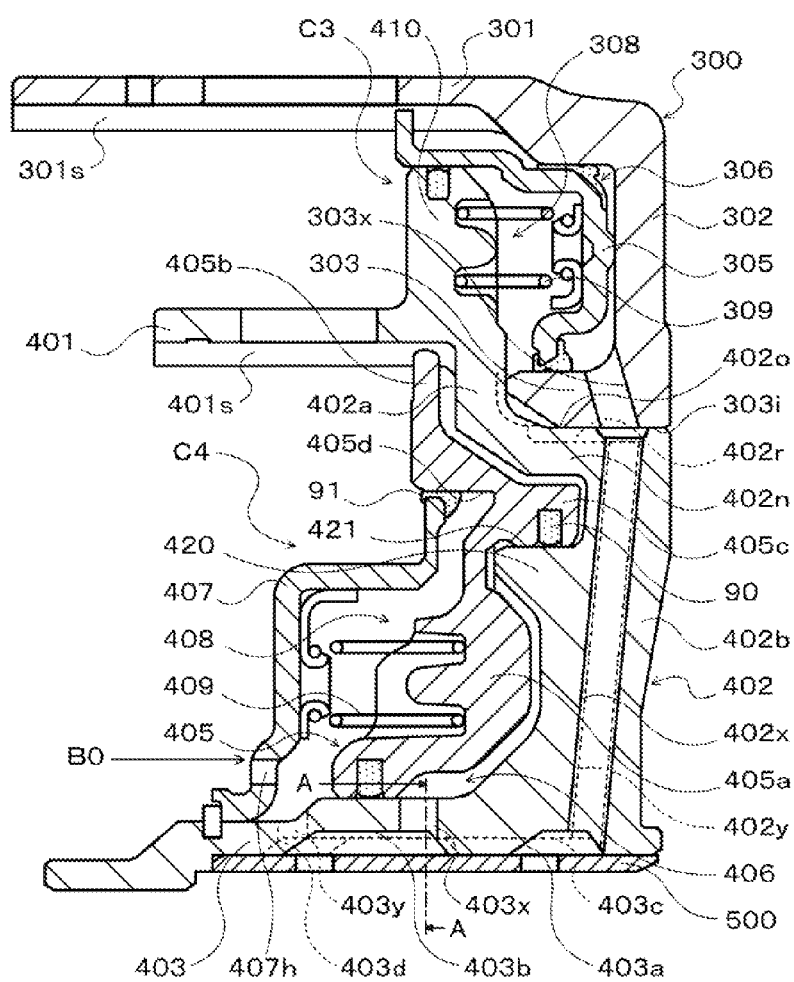
FIG. 9 is an enlarged main part sectional view showing the transmission device according to the second embodiment of the present disclosure.

As shown in FIGS. 8 and 9, the clutch drum 300 of the clutch C3 includes the substantially cylindrical outer cylinder portion (second outer cylinder portion) 301 that extends in the axial direction of the clutch drum 300 (automatic transmission 25B), and is connected to the second sun gear 36b of the second planetary gear mechanism 35 via the connecting member (not shown); the substantially disc-shaped annular wall portion (second annular wall portion) 302 extending inward from the base end (right end in FIGS. 8 and 9) of the outer cylinder portion 301; and the substantially cylindrical inner cylinder portion (second inner cylinder portion) 303 that extends from the inner circumferential portion of the annular wall portion 302 in the same direction as (coaxially with) the outer cylinder portion 301 so as to be located inside the outer cylinder portion 301, and extends in the axial direction of the clutch drum 300. The outer cylinder portion 301, the annular wall portion 302, and the inner cylinder portion 303 are integrally formed with one another, for example, by being cast from an aluminum alloy or the like. The annular wall portion 302 extends in the radial direction between the base end of the outer cylinder portion 301 and the base end of the inner cylinder portion 303. In the clutch drum 300 structured in this manner, each of the outer cylinder portion 301 on the outside and the inner cylinder portion 303 on the inside functions as a rib, so that the strength of the clutch drum 300 can favorably be increased.

The inner circumferential surface of the outer cylinder portion 301 of the clutch drum 300 is provided with the splines 301s engageable with dents and protrusions provided on the outer circumferential portion of each of the separator plates 304s. The separator plates 304s are fitted to the splines 301s of the outer cylinder portion 301 so as to be arranged alternately with the plurality of friction plates 304f fitted to the clutch hub 3. A backing plate is fitted to the splines 301s of the outer cylinder portion 301 so as to be capable of contacting one of the friction plates 304f placed closest to the first and second planetary gear mechanisms 30 and 35 (on the left side in FIG. 8), and the backing plate is supported in the axial direction by a snap ring mounted on the outer cylinder portion 301.

The inner cylinder portion 303 is formed shorter than the outer cylinder portion 301, and the piston 305 is supported by the outer circumferential surface of the inner cylinder portion 303 and the inner circumferential surface of the outer cylinder portion 301 surrounding the inner cylinder portion 303 so as to be movable in the axial direction. In the present embodiment, dents and protrusions engageable with the splines 301s of the outer cylinder portion 301 are provided on the outer circumferential portion of the pressing portion of the piston 305 contacting one of the separator plates 304s located closest to the engine (on the right side in FIG. 8), and the piston 305 is also guided by the splines 301s. Seal members are interposed between the piston 305 and the outer circumferential surface of the inner cylinder portion 303 and between the piston 305 and the inner circumferential surface of the outer cylinder portion 301, and the engagement oil chamber (second engagement oil chamber) 306 supplied with the hydraulic oil (engagement hydraulic pressure) for engaging the clutch C3 is defined between the annular wall portion 302 of the clutch drum 300 and the back surface of the piston 305. In other words, the clutch drum 300 and the piston 305 define the engagement oil chamber 306 in the clutch C3. In addition, as shown in FIGS. 8 and 9, the plurality of oil holes (through-holes) 303x each communicating with the engagement oil chamber 306 are arranged with spaces therebetween in the circumferential direction in the inner cylinder portion 303.

The clutch C4 includes the clutch hub (first clutch hub) 4; the plurality of friction plates (first friction engagement plates) 404f that have inner circumferential portions fitted to the clutch hub 4; the clutch drum (first clutch drum) 400; the plurality of separator plates (first friction engagement plates) 404s that have outer circumferential portions fitted to the clutch drum 400; and the piston (first piston) 405 that presses the friction plates 404f and the separator plates 404s to frictionally engage them with each other. The clutch hub 4 is integrated (connected) with the planetary carrier 34 of the first planetary gear mechanism 30 serving as a power input member so as to rotate together with the planetary carrier 34. The clutch drum 400 is connected (fixed) to the second sun gear 36b of the second planetary gear mechanism 35 serving as the power output member (target of transmission of power) to integrally rotate with the second sun gear 36b. Each of the friction plates 404f fitted to the clutch hub 4 is an annular member with friction materials attached to both surfaces thereof. Each of the separator plates 404s fitted to the clutch drum 400 is an annular member with both surfaces smoothly formed.

As shown in FIGS. 8 and 9, the clutch drum 400 of the clutch C4 includes the substantially cylindrical outer cylinder portion (first outer cylinder portion) 401 that extends in the axial direction of the clutch drum 400 (automatic transmission 25B), and is connected to the second sun gear 36b of the second planetary gear mechanism 35 via a connecting member (not shown); the substantially disc-shaped annular wall portion (first annular wall portion) 402 extending inward from one end of the outer cylinder portion 401; and the substantially cylindrical inner cylinder portion (first inner cylinder portion) 403 that extends from the inner circumferential portion of the annular wall portion 402 in the same direction as (coaxially with) the outer cylinder portion 401 so as to be located inside the outer cylinder portion 401, and extends in the axial direction of the clutch drum 400. The outer cylinder portion 401, the annular wall portion 402, and the inner cylinder portion 403 are integrally formed with one another, for example, by being cast from an aluminum alloy or the like. The annular wall portion 402 extends inward in the radial direction between the base end of the outer cylinder portion 401 and the base end of the inner cylinder portion 403.

An iron sleeve 500 is fitted (press-fitted) into the inner cylinder portion 403 of the clutch drum 400. An annular front support (supporting part on the front side) 22f made of, for example, an aluminum alloy is fixed to the transmission case 22 accommodating the clutches C3 and C4 to constitute a part of the transmission case 22, and a cylindrical portion 220 of the front support 22f is fit by insertion into the sleeve 500. With this arrangement, the clutch drum 400, that is, the inner cylinder portion 403 is rotatably supported by the front support 22f, that is, the transmission case 22. A stator shaft 230 connected to the stator 23s of the starting device 23 (torque converter) via the one-way clutch 23o is connected (held stationary) to the cylindrical portion 220 of the front support 22f.

The inner circumferential surface of the outer cylinder portion 401 of the clutch drum 400 is provided with the splines 401s engageable with dents and protrusions provided on the outer circumferential portion of each of the separator plates 404s. The separator plates 404s are fitted to the splines 401s of the outer cylinder portion 401 so as to be arranged alternately with the plurality of friction plates 404f fitted to the clutch hub 4. A backing plate is fitted to the splines 401s of the outer cylinder portion 401 so as to be capable of contacting one of the friction plates 404f placed closest to the first and second planetary gear mechanisms 30 and 35 (on the left side in FIG. 8), and the backing plate is supported in the axial direction by a snap ring mounted on the outer cylinder portion 401.

The annular wall portion 402 of the clutch drum 400 includes the outer wall portion (first outer annular wall portion) 402a extending toward the inner cylinder portion 403, that is, inward in the radial direction, from the base end of the outer cylinder portion 401, and includes the inner wall portion (first inner annular wall portion) 402b that is offset relative to the outer wall portion 402a in a direction away from the outer cylinder portion 401 so as to be located closer to the engine than the outer wall portion 402a (on the side opposite to the free end (open end) of the clutch drum 400, that is, on the right side in FIG. 8), and that extends in the radial direction between the outer wall portion 402a and the inner cylinder portion 403. This arrangement provides, in the annular wall portion 402, the reduced diameter portion (first intermediate cylinder portion) 402n that has the outer circumferential surface 402o having a diameter smaller than that of the outer circumferential surface of the outer cylinder portion 401, and that extends in the axial direction of the clutch drum 400 between the outer cylinder portion 401 and the inner cylinder portion 403 in the radial direction so as to be located on the opposite side of the outer cylinder portion 401 with respect to the outer wall portion 402a.

The annular wall portion 402 (inner wall portion 402b) of the clutch drum 400 includes a second intermediate cylinder portion 420 formed so as to be closer to the inner cylinder portion 403 than the outer circumferential surface 402o of the reduced diameter portion 402n, and so as to extend toward the piston 405 (leftward in FIGS. 8 and 9), and includes an annular recess 402c formed so as to be depressed outward (rightward in FIGS. 8 and 9) from the inner surface of the inner wall portion 402b between the outer circumferential surface 402o of the reduced diameter portion 402n and the second intermediate cylinder portion 420 in the radial direction. The inner cylinder portion 403 of the clutch drum 400 is formed longer than the outer cylinder portion 401, and the piston 405 is supported by the outer circumferential surface of the inner cylinder portion 403 so as to be movable in the axial direction.

The piston 405 of the Clutch C4 includes a pressure receiving portion (inner circumferential portion) 405a movably supported by the outer circumferential surface of the inner cylinder portion 403; a pressing portion 405b that extends from the outer circumferential portion of the pressure receiving portion 405a, and contacts one of the separator plates 404s located closest to the engine (on the right side in FIGS. 8 and 9); an cylindrical extending portion 405c extending toward the side opposite to the pressing portion 405b from the outer circumferential portion of the pressure receiving portion 405a; and a concave cylindrical surface 405d that lies outside the inner circumferential surface of the cylindrical extending portion 405c in the radial direction, and extends toward the side opposite to the extending portion 405c. Dents and protrusions engageable with the splines 401s of the outer cylinder portion 401 of the clutch drum 400 are provided on the outer circumferential portion of the pressing portion 405b. These dents and protrusions allow the piston 405 to be also guided by the splines 401s. The extending portion 405c of the piston 405 is inserted (fitted) into the annular recess 402c formed in the annular wall portion 402 of the clutch drum 400, and the inner circumferential surface of the extending portion 405c slidingly contacts an outer circumferential surface (cylindrical surface) 421 of the second intermediate cylinder portion 420 defining the annular recess 402c.

A seal member, such as a D-ring or an O-ring, is interposed between the pressure receiving portion 405a of the piston 405 and the outer circumferential surface of the inner cylinder portion 403, and a seal member 90, such as a D-ring or an O-ring, is interposed between the inner circumferential surface of the extending portion 405c of the piston 405 and the outer circumferential surface 421 of the second intermediate cylinder portion 420. This arrangement defines the engagement oil chamber (first engagement oil chamber) 406 supplied with the hydraulic oil (engagement hydraulic pressure) for engaging the clutch C4 at a place located between the annular wall portion 402 (inner wall portion 402b) of the clutch drum 400 and the back surface of the pressure receiving portion 405a of the piston 405, and inside the outer circumferential surface of the extending portion 405c in the radial direction. In other words, in the automatic transmission 25B, the clutch drum 400 and the piston 405 define the engagement oil chamber 406 inside the engagement oil chamber 306 of the clutch C3 in the radial direction.

In addition, the inner cylinder portion 403 of the clutch drum 400 supports the cancel plate 407 so as to rotate together with the cancel plate 407 in a position closer to the first and second planetary gear mechanisms 30 and 35 than the piston 405 (on the left side thereof in FIGS. 8 and 9). The inner circumferential portion of the cancel plate 407 is supported in the axial direction by a snap ring mounted on the inner cylinder portion 403. A lip seal (seal member) 91 is mounted on the outer circumferential portion of the cancel plate 407, and the seal member 91 slidingly contacts the concave cylindrical surface 405d provided on the piston 405. In this arrangement, the cancel plate 407, together with the piston 405, defines the centrifugal hydraulic pressure cancel chamber (first cancel oil chamber) 408 for canceling centrifugal hydraulic pressure produced in the engagement oil chamber 406. In addition, the plurality of return springs 409 are interposed between the piston 405 and the cancel plate 407.

The clutch drum 300 of the clutch C3 disposed around the clutch C4 structured as described above is fixed to the outer circumferential surface of the clutch drum 400 of the clutch C4 so as to surround at least a part of the outer cylinder portion 401. Specifically, the inner cylinder portion 303 of the clutch drum 300 is fitted to the reduced diameter portion 402n of the clutch drum 400 so that the distal end of the inner cylinder portion 303 contacts the back surface of the outer wall portion 402a of the clutch drum 400 (annular wall portion 402), and the inner circumferential surface 303i of the inner cylinder portion 303 is joined with the outer circumferential surface 402o of the reduced diameter portion 402n by welding (such as electron beam welding or laser welding). In this arrangement, the clutch drums 300 and 400 constitute an integrated drum member that defines, together with the piston 305, the engagement oil chamber 306 of the clutch C3, and also defines, together with the piston 405, the engagement oil chamber 406 of the clutch C4 inner side the engagement oil chamber 306 in the radial direction.

As a result, even if the joining portion between the inner cylinder portion 303 and the clutch drum 400 is displaced toward the inner circumference, the axial length of the inner cylinder portion 303 (inner circumferential surface 303i) and the reduced diameter portion 402n (outer circumferential surface 402o) of the clutch drum 400, that is, the length of the joint between the inner cylinder portion 303 and the clutch drum 400 can be sufficiently ensured to further increase the joint strength between the clutch drums 300 and 400, while favorably increasing the strength of the clutch drum 300 by utilizing each of the outer cylinder portion 301 on the outside and the inner cylinder portion 303 on the inside as a rib. Hence, in the automatic transmission 25B, when the clutch drums 300 and 400 rotate together with the second sun gear 36b of the second planetary gear mechanism 35, the free end (left end in FIG. 9) of the outer cylinder portion 301 of the clutch drum 300 can favorably be restrained from expanding outward due to a centrifugal force. The clutch drum 300 is fitted to the reduced diameter portion 402n so that the distal end surface of the inner cylinder portion 303 contacts the back surface of the outer wall portion 402a of the clutch drum 400. Consequently, the outer wall portion 402a can accurately position the clutch drum 300 in the axial direction.

Moreover, in the automatic transmission 25B, the clutch drum 400 (the outer cylinder portion 401) of the clutch C4 is integrally formed with the annular cancel oil chamber defining portion 410 defining, with the clutch drum 300 and the piston 305, the centrifugal hydraulic pressure cancel chamber 308 for canceling centrifugal hydraulic pressure produced in the engagement oil chamber 306 of the clutch C3 on the outside. As shown in FIGS. 8 and 9, the cancel oil chamber defining portion 410 extends from the outer circumferential surface of the outer cylinder portion 401 outward, that is, toward the outside in the radial direction of the annular recess 402c and toward the inner circumferential surface of the outer cylinder portion 301 of the clutch drum 300. As shown in FIGS. 8 and 9, the end surface 410z of the cancel oil chamber defining portion 410 is located closer to the free end side (open end side) of the clutch drum 400 than the end surface 402z of the outer wall portion 402a of the annular wall portion 402.

In this manner, the cancel oil chamber defining portion 410 for the clutch C3 is integrally formed with the clutch drum 400 of the clutch C4 including the outer cylinder portion 401, the annular wall portion 402 (the outer wall portion 402a, the inner wall portion 402b, and the reduced diameter portion 402n), and the inner cylinder portion 403, so that the number of components and the assembly man-hours of the clutches C3 and C4 can be reduced, and the accuracy of various parts of the clutch drum 400, that is, the positional accuracy of the outer cylinder portion 401, the annular wall portion 402, the inner cylinder portion 403, and the cancel oil chamber defining portion 410 can easily be improved. The outer cylinder portion 401, the annular wall portion 402, the inner cylinder portion 403, and the cancel oil chamber defining portion 410 are integrally formed with one another, so that the outer cylinder portion 401 and the inner cylinder portion 403 can function as ribs and the thickness of the cancel oil chamber defining portion 410 can be secured to favorably ensure strength of the clutch drum 400. Accordingly, the clutch drum 400 can be made of a lightweight material, such as an aluminum alloy, to be reduced in weight. In addition, in the present embodiment, the cancel oil chamber defining portion 410 is offset from the outer wall portion 402a of the clutch drum 400 in the axial direction of the outer cylinder portion 401 so as to be located closer to the first and second planetary gear mechanisms 30 and 35 than the outer wall portion 402a of the clutch drum 400 (on the left side thereof in FIG. 9). In other words, the end surface 410z of the cancel oil chamber defining portion 410 is located closer to the free end side (open end side) of the clutch drum 400 than the end surface 402z of the outer wall portion 402a. In this manner, the cancel oil chamber defining portion 410 is offset from the outer wall portion 402a in the axial direction of the outer cylinder portion 401, so that a stress concentration is reduced in the vicinity of the base end of the outer cylinder portion 401. Consequently, the strength of the clutch drum 400 can be further increased.

The outer circumferential surface of the cancel oil chamber defining portion 410 slidingly contacts the inner circumferential surface of the piston 305 of the clutch C3, and a seal member, such as a D-ring or an O-ring, is interposed between the cancel oil chamber defining portion 410 and the inner circumferential surface of the piston 305. This arrangement defines the centrifugal hydraulic pressure cancel chamber 308 between the piston 305 and the back surfaces of the cancel oil chamber defining portion 410 and the outer wall portion 402a (surfaces on the right side in FIGS. 8 and 9). In addition, the plurality of return springs 309 are interposed between the back surface of the cancel oil chamber defining portion 410 and the piston 305. As described above, the clutch drum 300 is fitted to the reduced diameter portion 402n so that the distal end of the inner cylinder portion 303 contacts the back surface of the outer wall portion 402a of the clutch drum 400. This arrangement can improve the positioning accuracy of the piston 305 supported by the inner cylinder portion 303 and the return springs 309 interposed between the piston 305 and the cancel oil chamber defining portion 410. Also in the present embodiment, a plurality of projections are provided at even intervals on the back surface of the cancel oil chamber defining portion 410, each of the plurality of projections projecting toward the piston 305 and engaging with one end of the corresponding return spring 309.

Figure 10:
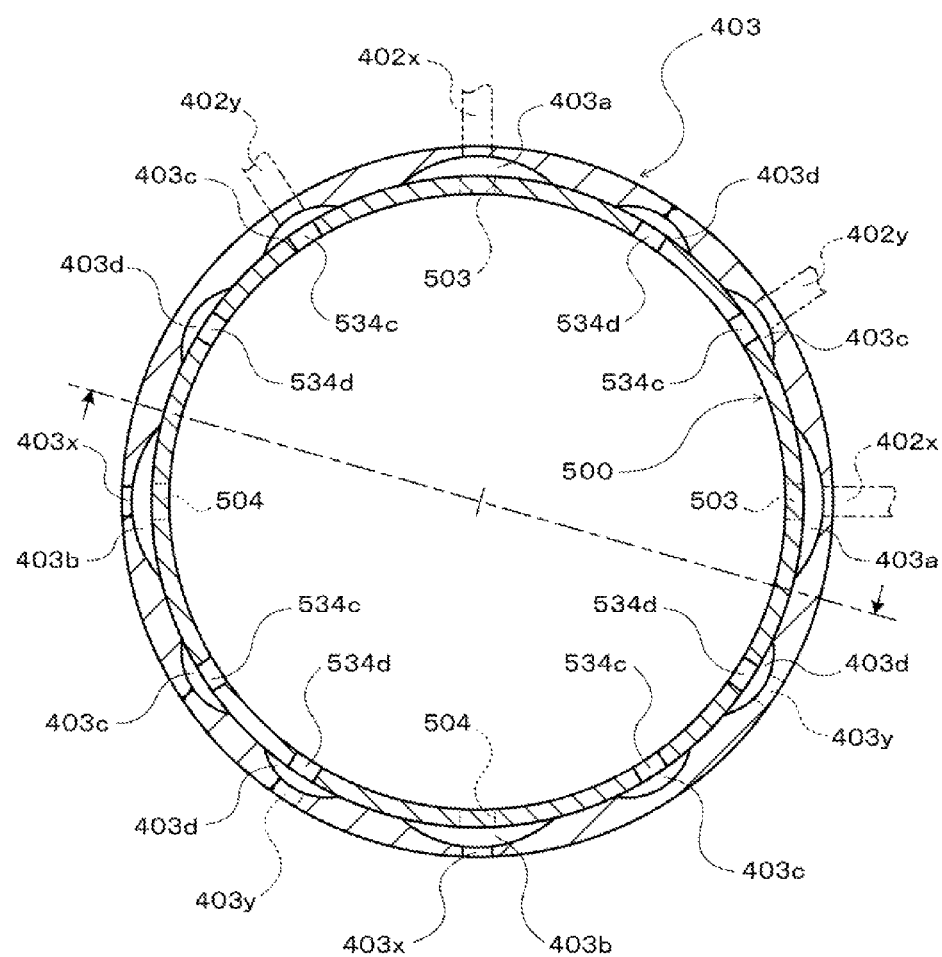
FIG. 10 is a sectional view cut along line A-A in FIG. 9.
Figure 11:
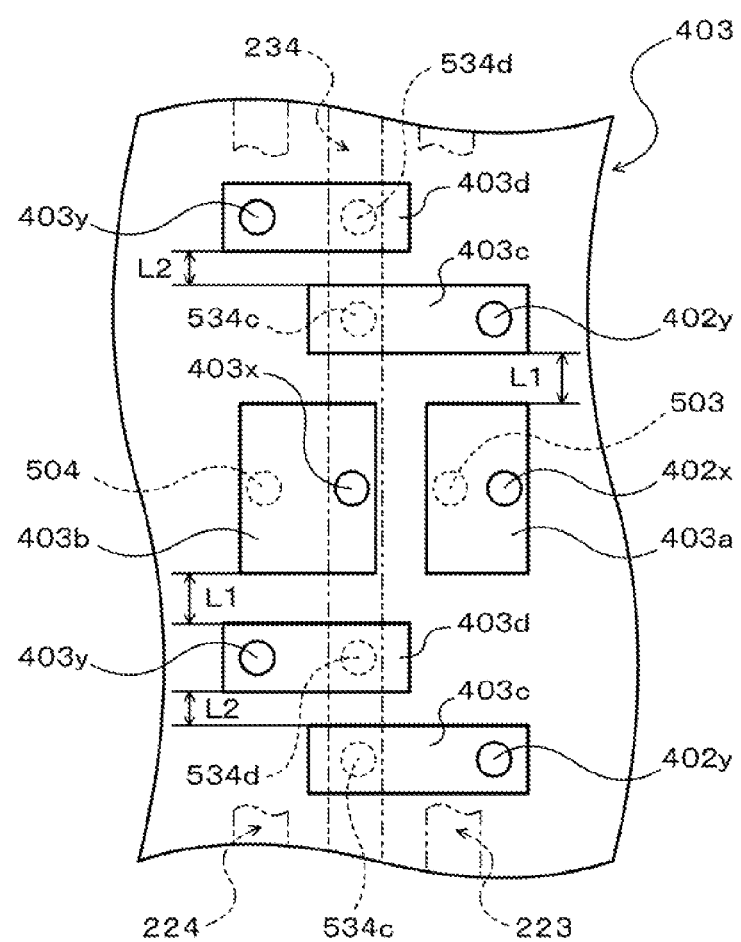
FIG. 11 is a schematic diagram showing an oil passage structure of a clutch of the transmission device according to the second embodiment of the present disclosure.

With reference to FIGS. 8 to 11, a description will be given of an oil passage structure for supplying the hydraulic oil to the engagement oil chamber 306 and the centrifugal hydraulic pressure cancel chamber 308 of the clutch C3, and to the engagement oil chamber 406 and the centrifugal hydraulic pressure cancel chamber 408 of the clutch C4. FIG. 10 is a sectional view cut along line A-A in FIG. 9. The lower side of the dashed-dotted line in FIG. 10 shows the range on the left side of the dashed-dotted line in FIG. 9, and the upper side of the dashed-dotted line in FIG. 10 shows the range on the right side of the dashed-dotted line in FIG. 9. FIG. 11 is a schematic diagram showing a state of the inner surface of the inner cylinder portion 403 as viewed from the axial center of the clutch drum 400. Dashed lines in FIG. 11 indicate elements of the sleeve 500, and chain double-dashed lines in FIG. 11 indicate elements of the front support 22f.

As shown in FIGS. 8 to 10, in the automatic transmission 25B, in order to allow the hydraulic oil to be supplied to and discharged from the engagement oil chamber 306 and the centrifugal hydraulic pressure cancel chamber 308 of the clutch C3 that are defined around the inner cylinder portion 303 of the clutch drum 300, the plurality of oil passages 402x for engagement oil chamber (of the same number as the oil holes 303x, that is, four, in the present embodiment) that extend in the radial direction in a radiating manner are formed in the inner wall portion 402b of the clutch drum 400, and the plurality of (four, in the present embodiment) oil passages 402y for cancel chamber that extend in the radial direction in a radiating manner alternately with the plurality of oil passages 402x for engagement oil chamber so as not to overlap the oil passages 402x when viewed from the axial direction are formed in the inner wall portion 402b of the clutch drum 400. The oil passages 402x for engagement oil chamber communicate with the respective oil holes 303x of the inner cylinder portion 303 of the clutch drum 300. Each of the oil passages 402y for cancel chamber communicates with corresponding one of the plurality of recesses 402r formed on the back surface of the outer wall portion 402a and the outer circumferential surface 402o of the reduced diameter portion 402n of the clutch drum 400 so as to extend in a substantially L-shape and communicate with the centrifugal hydraulic pressure cancel chamber 308 (refer to FIGS. 8 and 9).

In this manner, the oil passages 402x for engagement oil chamber and the oil passages 402y for cancel chamber are formed on substantially the same plane in the inner wall portion 402b of the clutch drum 400, so that increase in the axial length of the clutch drum 400, that is, the clutches C3 and C4 is suppressed. In addition, the oil passages 402x for engagement oil chamber and the oil passages 402y for cancel chamber are formed alternately with each other when viewed from the axial direction, so that the hydraulic oil can be substantially evenly supplied to the engagement oil chamber 306 and the centrifugal hydraulic pressure cancel chamber 308, each having a ring shape. The plurality of (four, in the present embodiment) oil holes 403x for C4 engagement oil chamber each communicating with the engagement oil chamber 406 are arranged with spaces therebetween in the circumferential direction in the inner cylinder portion 403 of the clutch drum 400.

Moreover, a plurality of (four, in the present embodiment) recesses 403a for C3 engagement oil chamber (recesses for second engagement oil chamber) communicating with the oil passages 402x for engagement oil chamber and a plurality of (four, in the present embodiment) recesses 403b for C4 engagement oil chamber (recesses for first engagement oil chamber) communicating with the oil holes 403x for C4 engagement oil chamber are formed on the inner circumferential surface of the inner cylinder portion 403 so as to be arranged with spaces in the circumferential direction between the recesses 403a and between the recesses 403b, respectively. In the present embodiment, as shown in FIG. 11, the recesses 403a for C3 engagement oil chamber and the recesses 403b for C4 engagement oil chamber are provided on the inner circumferential surface of the inner cylinder portion 403 so as to be arranged one by one in the axial direction of the clutch drum 400.

In addition, a plurality of (four, in the present embodiment) recesses 403c for C3 cancel chamber (recesses for second cancel chamber) communicating with the oil passages 402y for cancel chamber and a plurality of (four, in the present embodiment) recesses 403d for C4 cancel chamber (recesses for first cancel chamber) communicating with the oil holes 403y for C4 cancel chamber are formed on the inner circumferential surface of the inner cylinder portion 403 so as to be arranged in the circumferential direction with a space between each of the recesses 403c and the adjacent one of the recesses 403d, and so as to be arranged with a space in the circumferential direction between each of the recesses 403c and 403d and any of the recesses 403a for C3 engagement oil chamber and the recesses 403b for C4 engagement oil chamber. As shown in FIG. 11, a distance L1 in the circumferential direction from each of the recesses 403a for C3 engagement oil chamber and the recesses 403b for C4 engagement oil chamber to the adjacent one of the recesses 403c for C3 cancel chamber or the adjacent one of the recesses 403d for C4 cancel chamber is set larger than a distance L2 in the circumferential direction from each of the recesses 403c for C3 cancel chamber to the adjacent one of the recesses 403d for C4 cancel chamber.

As shown in FIG. 8, a C3 engagement hydraulic pressure supply oil passage (second engagement hydraulic pressure supply oil passage) 223, a C4 engagement hydraulic pressure supply oil passage (first engagement hydraulic pressure supply oil passage) 224, and a supply oil passage 234 for cancel chamber (cancel oil supply oil passage), each serving as an annular recess (groove), are formed on the outer circumferential surface of the cylindrical portion 220 of the front support 22f rotatably supporting the clutch drum 400. The C3 engagement hydraulic pressure supply oil passage 223 is formed on the base end side (right end side in FIG. 8) of the cylindrical portion 220 so as to be located inside the recesses 403a for C3 engagement oil chamber of the inner cylinder portion 403 supported by the cylindrical portion 220, and is connected to the hydraulic pressure control device (not shown) through corresponding one of a plurality of radial oil passages 221, corresponding one of a plurality of axial oil passages 222, and corresponding one of a plurality of oil holes 225, each formed in the front support 22f.

The C4 engagement hydraulic pressure supply oil passage 224 is formed on the free end side (left end side in FIG. 8) of the cylindrical portion 220 so as to be located inside the recesses 403b for C4 engagement oil chamber of the inner cylinder portion 403 supported by the cylindrical portion 220, and is connected to the hydraulic pressure control device through corresponding one of the plurality of radial oil passages 221, corresponding one of the plurality of axial oil passages 222, and corresponding one of the oil holes 225, each formed in the front support 22f. The supply oil passage 234 for cancel chamber is formed on the cylindrical portion 220 so as to be located between the C3 engagement hydraulic pressure supply oil passage 223 and the C4 engagement hydraulic pressure supply oil passage 224 in the axial direction of the cylindrical portion 220, and is connected to the hydraulic pressure control device (draining oil passage) through corresponding one of the plurality of radial oil passages 221, corresponding one of the plurality of axial oil passages 222, and corresponding one of the plurality of oil holes 225, each formed in the front support 22f.

As shown in FIG. 11, a plurality of oil holes 503 and oil holes 504 and a plurality of C3 cancel oil supply holes (second cancel oil supply holes) 534c and C4 cancel oil supply holes (first cancel oil supply holes) 534d are formed in the sleeve 500 fitted into the inner cylinder portion 403 of the clutch drum 400. The oil holes 503 are formed in the sleeve 500 so as to communicate the C3 engagement hydraulic pressure supply oil passage 223 on the inside with the recesses 403a for C3 engagement oil chamber on the outside. The oil holes 504 are formed in the sleeve 500 so as to communicate the C4 engagement hydraulic pressure supply oil passage 224 on the inside with the recesses 403b for C4 engagement oil chamber on the outside.

Moreover, the C3 cancel oil supply holes 534c are formed in the sleeve 500 so as to communicate the supply oil passage 234 for cancel chamber on the inside with the recesses 403c for C3 cancel chamber on the outside to supply the hydraulic oil (cancel oil) from the supply oil passage 234 for cancel chamber to the recesses 403c for C3 cancel chamber. The C4 cancel oil supply holes 534d are formed in the sleeve 500 so as to communicate the supply oil passage 234 for cancel chamber on the inside with the recesses 403d for C4 cancel chamber on the outside to supply the hydraulic oil (cancel oil) from the supply oil passage 234 for cancel chamber to the recesses 403d for C4 cancel chamber.

With this arrangement, the hydraulic oil (the engagement hydraulic pressure for the clutch C3) supplied from the hydraulic pressure control device through the oil passages 221 and 222 and other portions of the front support 22f to the C3 engagement hydraulic pressure supply oil passage 223 of the cylindrical portion 220 is supplied to the engagement oil chamber 306 of the clutch C3 through the oil holes 503 of the sleeve 500, the recesses 403a for C3 engagement oil chamber of the inner cylinder portion 403, the oil passages 402x for engagement oil chamber of the inner wall portion 402b, and the oil holes 303x of the inner cylinder portion 303 of the clutch drum 300. Also, the hydraulic oil (the engagement hydraulic pressure for the clutch C4) supplied from the hydraulic pressure control device through the oil passages 221 and 222 and other portions of the front support 22f to the C4 engagement hydraulic pressure supply oil passage 224 of the cylindrical portion 220 is supplied to the engagement oil chamber 406 of the clutch C4 through the oil holes 504 of the sleeve 500, the recesses 403b for C4 engagement oil chamber, and the oil holes 403x for C4 engagement oil chamber of the inner cylinder portion 403.

Moreover, the hydraulic oil (the cancel oil, that is, the drained oil) supplied from the hydraulic pressure control device through the oil passages 221 and 222 and other portions of the front support 22f to the supply oil passage 234 for cancel chamber of the cylindrical portion 220 is supplied to the centrifugal hydraulic pressure cancel chamber 308 of the clutch C3 through the C3 cancel oil supply holes 534c of the sleeve 500, the recesses 403c for C3 cancel chamber of the inner cylinder portion 403, and the oil passages 402y for cancel chamber and the recesses 402r of the inner wall portion 402b. The hydraulic oil (the cancel oil, that is, the drained oil) supplied from the hydraulic pressure control device through the oil passages 221 and 222 and other portions of the front support 22f to the supply oil passage 234 for cancel chamber of the cylindrical portion 220 is also supplied to the centrifugal hydraulic pressure cancel chamber 408 of the clutch C4 through the C4 cancel oil supply holes 534d of the sleeve 500, and the recesses 403d for C4 cancel chamber and the oil holes 403y for C4 cancel chamber of the inner cylinder portion 403.

In the present embodiment, as shown in FIG. 11, the plurality of C3 cancel oil supply holes 534c and the C4 cancel oil supply holes 534d are provided in the sleeve 500 so as to be aligned along a line in the circumferential direction (but may be slightly out of alignment in the axial direction). This arrangement allows the hydraulic oil (cancel oil) to be supplied to the C3 cancel oil supply holes 534c and the C4 cancel oil supply holes 534d from the common (single) supply oil passage 234 for cancel chamber formed on the cylindrical portion 220 of the front support 22f. As a result, in the automatic transmission 25B, increase in the axial length of the inner cylinder portion 403 of the clutch drum 400, that is, the clutches C3 and C4 can be suppressed.

As described above, the clutch drum (first clutch drum) 400 of the clutch (first clutch) C4 constituting the automatic transmission 25B according to the second embodiment also includes the outer cylinder portion (first outer cylinder portion) 401 that extends in the axial direction and is fitted to the outer circumferential portion of each of the separator plates (first friction engagement plates) 404s; the inner cylinder portion (first inner cylinder portion) 403 that extends in the axial direction inside the outer cylinder portion 401 and movably supports the pressure receiving portion (inner circumferential portion) 405a of the piston (first piston) 405; and the annular wall portion 402 that is integrally formed with the outer cylinder portion 401 and the inner cylinder portion 403 so as to extend in the radial direction between the outer cylinder portion 401 and the inner cylinder portion 403. The annular wall portion 402 includes the reduced diameter portion (first intermediate cylinder portion) 402n that extends in the axial direction between the outer cylinder portion 401 and the inner cylinder portion 403 in the radial direction; the outer wall portion (first outer annular wall portion) 402a that extends in the radial direction between the reduced diameter portion 402n and the outer cylinder portion 401; and the inner wall portion (first inner annular wall portion) 402b that extends in the radial direction between the inner cylinder portion 403 and the reduced diameter portion 402n. Moreover, the clutch drum (second clutch drum) 300 of the clutch (second clutch) C3 disposed around the clutch C4 is fixed to the clutch drum 400 so as to surround at least a part of the outer cylinder portion 401. The cancel oil chamber defining portion 410 defines the centrifugal hydraulic pressure cancel chamber (second cancel oil chamber) 308 for canceling the centrifugal hydraulic pressure produced in the engagement oil chamber (second engagement oil chamber) 306 of the clutch C3, and is integrally formed with the clutch drum 400 so as to extend outward from the outer circumferential surface of the outer cylinder portion 401. The end surface 410z of the cancel oil chamber defining portion 410 is located closer to the open end side (free end side) of the clutch drum 400 than the end surface 402z of the outer wall portion 402a. Also in the automatic transmission 25B, this arrangement can reduce the number of components and the assembly man-hours of the clutch C4 and the clutch C3 disposed around the clutch C4, and can reduce the weight of the clutches C3 and C4 while ensuring the strength thereof.

Moreover, also in the clutch drum 300 of the clutch C3 constituting the automatic transmission 25B, each of the outer cylinder portion 301 on the outside and the inner cylinder portion 303 on the inside functions as a rib, so that the strength of the clutch drum 300 can favorably be increased. Furthermore, the inner circumferential surface 303i of the inner cylinder portion 303 is welded to the outer circumferential surface of the clutch drum 400, so that the joint strength therebetween can favorably be ensured. As a result, when the clutch drum C4 rotates, the free end (open end) of the outer cylinder portion 301 of the clutch drum 300 can favorably be restrained from expanding outward due to the centrifugal force. Instead of being welded to the outer circumferential surface of the clutch drum 400, however, the inner circumferential surface 303i of the inner cylinder portion 303 may be bonded to the outer circumferential surface of the clutch drum 400 with adhesive therebetween.

Also in the automatic transmission 25B, the cancel oil chamber defining portion 410 is offset from the outer wall portion 402a in the axial direction of the outer cylinder portion 401 so that the end surface 410z is located closer to the free end side (open end side) of the clutch drum 400 than the end surface 402z of the outer wall portion 402a. As a result, the stress concentration is reduced in the vicinity of the base end of the outer cylinder portion 401, that is, the connecting portion (corner portion) between the outer cylinder portion 401 and the outer wall portion 402a, whereby the strength of the clutch drum 400 can be further increased. In addition, the inner circumferential surface 303i of the inner cylinder portion 303 is joined with the outer circumferential surface 402o of the reduced diameter portion 402n, so that the axial length of the inner cylinder portion 303 and the reduced diameter portion 402n of the clutch drum 400, that is, the length of the joint between the inner cylinder portion 303 and the clutch drum 400 can favorably be ensured to further increase the joint strength therebetween.

Furthermore, also in the automatic transmission 25B, the inner cylinder portion 303 of the clutch drum 300 is fitted to the reduced diameter portion 402n of the clutch drum 400 so that the distal end surface of the inner cylinder portion 303 contacts the back surface of the outer wall portion 402a of the clutch drum 400 (annular wall portion 402). This arrangement allows the outer wall portion 402a to accurately position the clutch drum 300 in the axial direction, and can improve the positioning accuracy of the piston 305 supported by the inner cylinder portion 303 and the return springs 309 interposed between the piston 305 and the cancel oil chamber defining portion 410.

The piston 405 constituting the clutch (first clutch) C4 of the automatic transmission 25B includes the cylindrical extending portion 405c extending in axial direction toward the annular wall portion 402. The annular wall portion 402 of the clutch drum 400 includes the second intermediate cylinder portion 420 that is formed so as to be closer to the inner cylinder portion 403 than the outer circumferential surface 402o of the reduced diameter portion 402n, that is, than the joint surface between the clutch drums 300 and 400, and so as to extend toward the piston 405, and includes the annular recess 402c that is formed so as to be closer to the inner cylinder portion 403 than the outer circumferential surface 402o of the reduced diameter portion 402n and into which the extending portion 405c of the piston 405 is inserted (fitted). The extending portion 405c of the piston 405 is inserted (fitted) into the annular recess 402c of the annular wall portion 402, and the seal member 90 is interposed between the inner circumferential surface of the extending portion 405c and the outer circumferential surface 421 of the second intermediate cylinder portion 420. With this arrangement, the piston 405 and the annular wall portion 402 define the engagement oil chamber (first engagement oil chamber) 406 of the clutch C4 inside the outer circumferential surface of the extending portion 405c in the radial direction.

In this manner, the engagement oil chamber 406 is defined by making the inner circumferential surface of the extending portion 405c of the piston 405 in the clutch C4 slidingly contact the outer circumferential surface 421 of the second intermediate cylinder portion 420 defining the annular recess 402c of the annular wall portion 402, and by interposing the seal member 90 between the inner circumferential surface of the extending portion 405c and the outer circumferential surface 421 of the second intermediate cylinder portion 420, so that the distance can be increased between the joint surface of the clutch drums 300 and 400 and the outer circumferential surface 421 of the second intermediate cylinder portion 420 slidingly contacting the inner circumferential surface of the extending portion 405c. As a result, when the clutch drum 300 is welded to the outer circumferential surface 402o of the clutch drum 400 (reduced diameter portion 402n), the outer circumferential surface 421 of the second intermediate cylinder portion 420 can favorably be kept from being distorted by influence of heat.

The clutch drum 400 of the clutch C4 is integrally formed with the cancel oil chamber defining portion 410 extending toward the outside in the radial direction of the annular recess 402c, facing the piston 305 of the clutch C3, and defining the centrifugal hydraulic pressure cancel chamber 308 for canceling the centrifugal hydraulic pressure produced in the engagement oil chamber 306. This arrangement requires, for example, the piston 405, the return springs 409, and the seal members to be assembled and mounted on the clutch drum 300 in advance before the clutch drum 300 is welded to the outer circumferential surface 402o of the clutch drum 400 (reduced diameter portion 402n). In the automatic transmission 25B, however, the dimensional accuracy of the outer circumferential surface 421 of the second intermediate cylinder portion 420 can favorably be ensured after the welding of the clutch drums 300 and 400, as described above. This eliminates the need for surface treatment and cleaning of the outer circumferential surface 421 of the second intermediate cylinder portion 420 after the welding of the clutch drums 300 and 400. As a result, the dimensional accuracy of the clutch C4 and ease of assembly of the entire automatic transmission 25B can be further improved.

The piston 405 includes the concave cylindrical surface 405d lying outside the inner circumferential surface of the cylindrical extending portion 405c in the radial direction, extending toward the side opposite to the cylindrical extending portion 405c, and slidingly contacting the seal member 91 mounted on the outer circumferential portion of the cancel plate 407 of the clutch C4. As found from FIG. 9, this arrangement allows the chamber diameter (outer diameter) of the centrifugal hydraulic pressure cancel chamber (first cancel oil chamber) 408 of the clutch C4 to be larger than the chamber diameter (outer diameter) of the engagement oil chamber 406, and thus can favorably ensure the performance of canceling the centrifugal hydraulic pressure in the centrifugal hydraulic pressure cancel chamber 408, so that the stiffness (spring constant) of the return springs 409 can be reduced. As a result, the hydraulic pressure (engagement hydraulic pressure for the clutch C4) to be supplied to the engagement oil chamber 406 can be reduced to engage the clutch C4, so that the fuel economy of the vehicle equipped with the automatic transmission 25B can be improved.

In this manner, in the automatic transmission 25B, the centrifugal hydraulic pressure cancel chamber 408 of the clutch C4 can have a larger chamber diameter than the chamber diameter of the engagement oil chamber 406, so that a sufficiently high canceling performance for the centrifugal hydraulic pressure can be ensured in the centrifugal hydraulic pressure cancel chamber 408. Hence, in the clutch C4, as shown in FIGS. 8 and 9, at least one oil hole 407h is formed in the inner circumferential portion of the cancel plate 407 to allow a zero base point B0 of the centrifugal hydraulic pressure in the centrifugal hydraulic pressure cancel chamber 408 to be displaced to the outermost peripheral point of the oil hole 407h outward in the radial direction (refer to FIG. 9). With this arrangement, the hydraulic oil (cancel oil) that has flowed into the centrifugal hydraulic pressure cancel chamber 408 from the oil hole 407h of the cancel plate 407 can partially flow out to be used for lubrication of, for example, the meshing portion between the sun gear 31 and the pinion gear 33a, the meshing portion between the pinion gear 33b and the pinion gear 33a, and the meshing portion between the pinion gear 33b and the ring gear 32 of the first planetary gear mechanism 30.

In the automatic transmission 25B, the recesses 403c for C3 cancel chamber (recesses for second cancel chamber) and the recesses 403d for C4 cancel chamber (recesses for first cancel chamber) are formed on the inner circumferential surface of the inner cylinder portion 403 of the clutch drum 400 constituting the drum member in conjunction with the clutch drum 300. The recesses 403c for C3 cancel chamber communicate with the oil passages 402y for cancel chamber extending in the radial direction and communicating with the centrifugal hydraulic pressure cancel chamber 308 of the clutch C3 on the outside, and communicate with the supply oil passage 234 for cancel chamber (cancel oil supply oil passage); the recesses 403d for C4 cancel chamber communicate with the oil holes 403y for C4 cancel chamber formed in the inner cylinder portion 403 so as to communicate with the centrifugal hydraulic pressure cancel chamber 408 of the clutch C4 on the inside, and communicate with the supply oil passage 234 for cancel chamber; and the recesses 403c and 403d are arranged with spaces therebetween in the circumferential direction.

This arrangement can displace the zero base point B0 of the centrifugal hydraulic pressure in the centrifugal hydraulic pressure cancel chamber 408 of the clutch C4 outward in the radial direction, as described above, without changing the zero base point of the centrifugal hydraulic pressure in the centrifugal hydraulic pressure cancel chamber (second cancel oil chamber) 308 of the clutch C3. As a result, the automatic transmission 25B can favorably ensure the performance of canceling the centrifugal hydraulic pressure in both the centrifugal hydraulic pressure cancel chambers 308 and 408.

Specifically, the inner circumferential surface of the inner cylinder portion 403 of the clutch drum 400 is provided with the recesses 403c for C3 cancel chamber that supply the hydraulic oil (cancel oil) to the oil passages 402y for cancel chamber and the recesses 403d for C4 cancel chamber that supply the hydraulic oil (cancel oil) to the oil holes 403y for C4 cancel chamber, in a manner independent from each other, so that the zero base points of the centrifugal hydraulic pressure in the centrifugal hydraulic pressure cancel chambers 308 and 408 can be set independently from each other. As a result, in the automatic transmission 25B, the degree of freedom of adjustment can be increased for the canceling performance in the centrifugal hydraulic pressure cancel chamber 408 of the clutch (first clutch) C4 on the inside and the canceling performance in the centrifugal hydraulic pressure cancel chamber 308 of the clutch (second clutch) C3 on the outside.

In the embodiment described above, the distance L1 in the circumferential direction from each of the recesses 403a for C3 engagement oil chamber and the recesses 403b for C4 engagement oil chamber to the adjacent one of the recesses 403c for C3 cancel chamber or the adjacent one of the recesses 403d for C4 cancel chamber is set larger than the distance L2 in the circumferential direction from each of the recesses 403c for C3 cancel chamber to the adjacent one of the recesses 403d for C4 cancel chamber. Accordingly, excellent sealing performance is ensured between each of the recesses 403a for C3 engagement oil chamber and the recesses 403b for C4 engagement oil chamber and the adjacent one of the recesses 403c for C3 cancel chamber or the adjacent one of the recesses 403d for C4 cancel chamber, allowing flow of the hydraulic oil to be suppressed between each of the recesses 403a for C3 engagement oil chamber and the recesses 403b for C4 engagement oil chamber and the adjacent one of the recesses 403c for C3 cancel chamber or the adjacent one of the recesses 403d for C4 cancel chamber.

In addition, in the embodiment described above, the plurality of C3 cancel oil supply holes 534c that supply the hydraulic oil (cancel oil) to the recesses 403c for C3 cancel chamber and the plurality of C4 cancel oil supply holes 534d that supply the hydraulic oil (cancel oil) to the recesses 403d for C4 cancel chamber are provided so as to be aligned along a line in the circumferential direction in the sleeve 500 fitted into the inner cylinder portion 403 of the clutch drum 400. The hydraulic oil (cancel oil) is supplied from the common supply oil passage 234 for cancel chamber provided inside the inner cylinder portion 403 to the C3 cancel oil supply holes 534c and the C4 cancel oil supply holes 534d. As a result, increase in the axial length of the inner cylinder portion 403 of the clutch drum 400, that is, the clutches C3 and C4, can be suppressed.

While the embodiments of the present disclosure have been described, the present disclosure is not in any way limited to the embodiments described above, and various modifications can be obviously made within the breadth of the present disclosure. The above-described embodiments to carry out the disclosure are merely specific embodiments of the disclosure described in the "SUMMARY" section, and do not limit the elements of the disclosure described in the "SUMMARY" section.

INDUSTRIAL APPLICABILITY

The present disclosure can be used in, for example, industries for manufacturing transmission devices or power transmission devices including the transmission devices.

The invention claimed is:
1. A transmission device comprising:
a first clutch that includes a first clutch drum, a first piston, and a first engagement oil chamber; and
a second clutch that includes a second clutch drum fixed to an outer circumferential portion of the first clutch drum, a second piston, and a second engagement oil chamber, wherein
the first clutch drum includes a first outer cylinder portion that extends in an axial direction and is fitted with an outer circumferential portion of a first friction engagement plate, a first inner cylinder portion that extends in the axial direction inside the first outer cylinder portion and movably supports an inner circumferential portion of the first piston, and a first annular wall portion that is integrally formed with the first outer cylinder portion and the first inner cylinder portion so as to extend in a radial direction between the first outer cylinder portion and the first inner cylinder portion;
the second clutch drum includes a second outer cylinder portion that extends in the axial direction and is fitted with an outer circumferential portion of a second friction engagement plate, a second inner cylinder portion that extends in the axial direction inside the second outer cylinder portion and movably supports an inner circumferential portion of the second piston, and a second annular wall portion integrally formed with the second outer cylinder portion and the second inner cylinder portion so as to extend in the radial direction between the second outer cylinder portion and the second inner cylinder portion; and an inner circumferential surface of the second inner cylinder portion is joined with an outer circumferential surface of the first clutch drum so that the second annular wall portion overlaps the first annular wall portion of the first clutch drum in the axial direction as seen from the radial direction.

2. The transmission device according to claim 1, wherein the first annular wall portion of the first clutch drum includes a first outer annular wall portion extending toward the first inner cylinder portion from a base end of the first outer cylinder portion, and a distal end surface of the second inner cylinder portion of the second clutch drum contacts the first outer annular wall portion of the first clutch drum.

3. The transmission device according to claim 2, wherein the first annular wall portion of the first clutch drum includes a first intermediate cylinder portion that extends in the axial direction between the first outer cylinder portion and the first inner cylinder portion in the radial direction and includes an outer circumferential surface having a diameter smaller than that of the first outer cylinder portion, and the inner circumferential surface of the second inner cylinder portion is joined with the outer circumferential surface of the first intermediate cylinder portion.

4. The transmission device according to claim 3, wherein the inner circumferential surface of the second inner cylinder portion is welded to the outer circumferential surface of the first clutch drum.

5. The transmission device according to claim 4, wherein the first clutch drum and the second clutch drum each are made of an aluminum alloy, and the inner circumferential surface of the second inner cylinder portion is welded by electron beam to the outer circumferential surface of the first clutch drum.

6. The transmission device according to claim 2, wherein the distal end surface of the second inner cylinder portion of the second clutch drum is welded to the first outer annular wall portion of the first clutch drum.

* * * * *